(12) United States Patent
Park

(10) Patent No.: US 10,282,252 B2
(45) Date of Patent: May 7, 2019

(54) RAID STORAGE DEVICE AND METHOD OF MANAGEMENT THEREOF

(71) Applicant: SAMSUNG ELECTRONICS CO., LTD., Suwon-si, Gyeonggi-Do (KR)

(72) Inventor: Hyunsik Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 248 days.

(21) Appl. No.: 15/435,401

(22) Filed: Feb. 17, 2017

(65) Prior Publication Data
US 2017/0322847 A1    Nov. 9, 2017

(30) Foreign Application Priority Data

May 3, 2016    (KR) .................. 10-2016-0054793

(51) Int. Cl.
*G06F 11/07*    (2006.01)
*G06F 11/10*    (2006.01)
*G06F 11/20*    (2006.01)

(52) U.S. Cl.
CPC ...... *G06F 11/1092* (2013.01); *G06F 11/2058* (2013.01)

(58) Field of Classification Search
CPC ............ G06F 11/1076; G06F 11/1092; G06F 11/2058
USPC .............................................. 714/6.22, 6.24
See application file for complete search history.

(56) References Cited

U.S. PATENT DOCUMENTS

| | | | |
|---|---|---|---|
| 5,278,838 A | 1/1994 | Ng et al. | |
| RE36,846 E | 8/2000 | Ng et al. | |
| 7,313,724 B1 | 12/2007 | Kekre et al. | |
| 8,195,912 B2 | 6/2012 | Flynn et al. | |
| 8,751,862 B2 | 6/2014 | Cherian et al. | |
| 8,788,876 B2 | 7/2014 | Jeddeloh | |
| 8,825,950 B2 | 9/2014 | Bert | |
| 9,195,541 B2 | 11/2015 | Lee | |
| 9,569,306 B1* | 2/2017 | Camp | G06F 11/108 |
| 2011/0066793 A1* | 3/2011 | Burd | G06F 11/1028 711/103 |
| 2011/0271039 A1* | 11/2011 | Baek | G06F 12/0246 711/103 |
| 2013/0262920 A1* | 10/2013 | Jung | G06F 11/1076 714/6.22 |

(Continued)

FOREIGN PATENT DOCUMENTS

JP    3788961 B2    4/2006
KR    1019980047273 A    9/1998

*Primary Examiner* — Chae M Ko
(74) *Attorney, Agent, or Firm* — Volentine, Whitt & Francos, PLLC

(57) ABSTRACT

A method of managing a plurality of storage devices controlled in a RAID scheme includes detecting a failure disk among the storage devices, selecting one of a plurality of stripes of the storage devices according to a result of the detection, identifying a valid page of data included in a normal chunk of the selected stripe and a valid page of data of a lost chunk mapped to the failure disk with reference to address mapping information, recovering the valid page of the lost chunk among chunks included in the selected stripe with reference to information on the identified valid page, and copying the recovered valid page of the lost chunk and the valid page of the normal chunk to a new stripe of the storage devices.

20 Claims, 15 Drawing Sheets

(56) References Cited

U.S. PATENT DOCUMENTS

| | | | |
|---|---|---|---|
| 2014/0372697 A1* | 12/2014 | Pereira | G06F 11/1088 |
| | | | 711/114 |
| 2014/0372698 A1 | 12/2014 | Lee et al. | |
| 2014/0380092 A1* | 12/2014 | Kim | G06F 11/108 |
| | | | 714/6.24 |
| 2015/0095696 A1 | 4/2015 | Hess et al. | |
| 2016/0188410 A1* | 6/2016 | Lee | G06F 11/1044 |
| | | | 714/6.24 |

* cited by examiner

RAID STORAGE DEVICE AND METHOD OF MANAGEMENT THEREOF

CROSS-REFERENCE TO RELATED APPLICATIONS

This U.S. non-provisional patent application claims priority under 35 U.S.C. § 119 to Korean Patent Application No. 10-2016-0054793, filed on May 3, 2016, the entirety of which is hereby incorporated by reference.

BACKGROUND

Example embodiments of inventive concepts relate generally to semiconductor memory devices and, more particularly, to a redundant array of inexpensive disks (RAID) storage device and a method of management thereof.

Flash memory devices have been widely used as an audio and video data storage media of information devices such as a computer, a smartphone, a personal digital assistant (PDA), a digital camera, a camcorder, a voice recorder, an MP3 player, and a handheld personal computer (PC). However, an erase operation is necessarily performed in advance to write data into a flash memory, and a unit of written data for a flash memory device is greater than a unit of erased data. This feature prevents a file system for a typical hard disk from being used as it is, even when the flash memory is used as an auxiliary memory device. Moreover, this feature implies that sequential input/output processing to a flash memory is more efficient than non-sequential input/output processing.

A representative example of a mass storage device based on a flash memory is a solid state drive (hereinafter referred to as "SSD"). The demand for SSDs is tremendously increasing, and purposes for which SSDs are being applied are diversifying. For example, an SSD may be employed as an SSD for a server, an SSD for a client, an SSD for a data center, and the like. An interface of an SSD should provide optimal speed and reliability according to each of the purposes. SATA (Serial Advanced Technology Attachment), PCIe (Peripheral Component Interconnect Express), SAS (Serial Attached SCSI), etc. have been applied as an SSD interface to satisfy the requirement.

Additionally, a storage system including a plurality of storage devices is used to achieve high reliability. For example, a redundant array of independent disks (RAID) storage system partitions single data and stores the partitioned data in units of chunks after distributing the partitioned data to a plurality of storage devices. Since there is little chance that the plurality of storage devices all suffer from a problem at the same time, the storage system may ensure a high reliability of data. For example, even if one of these chunks is lost due to damage or loss to one of the storage devices, the data may still be reconstituted correctly if error correction coding or parity is applied to the data before it is partitioned.

SUMMARY

The present disclosure relates to a memory management technique which is capable of performing both a rebuild operation to recover a failure disk and a garbage collection operation when a disk fails.

Some example embodiments relate to a method of managing a plurality of storage devices controlled in a redundant array of inexpensive disks (RAID) scheme. The method may include detecting a failure disk among the storage devices, selecting one of a plurality of stripes of the storage devices according to a result of the detection, identifying a valid page of data included in a normal chunk of data of the selected stripe and a valid page of data of a lost chunk mapped to the failure disk with reference to address mapping information, recovering the valid page of the lost chunk among chunks included in the selected stripe with reference to information on the identified valid page, and copying the recovered valid page of the lost chunk and the valid page of the normal chunk to a new stripe of the storage devices.

Other example embodiments relate to a redundant array of inexpensive disks (RAID) storage device. The RAID storage device may include a plurality of solid state drives and a host interface configured to connect the solid state drives to a host. Among pages of a lost chunk included in a failure disk among the solid state drives, only valid pages may be recovered during a RAID rebuild operation to recover the lost chunk using a parity chunk.

Still other example embodiments relate to a method of managing a plurality of solid state drives. The method may include selecting one of a plurality of stripes allocated to manage the solid state drives in a log-structured redundant array of inexpensive disks (RAID) architecture, identifying a valid page included in a normal chunk of the selected stripe and a valid page of a lost chunk mapped to a failure disk with reference to a first map page to map a logical address of pages included in the selected stripe to a physical address and a reverse map page to map the physical address of pages included in the selected stripes to the logical address, recovering a valid pages included in the lost chunk among chunks included in the selected stripe with reference to information on the identified valid page, and copying a valid page of the recovered lost chunk and valid pages of the normal chunk to a new stripe.

Still other example embodiments relate to a data storage system. The data storage system may comprise: a plurality of solid state data storage devices; and a controller connected to the plurality of solid state data storage devices. The plurality of solid state data storage devices include a plurality of stripes allocated for the controller to manage the solid state data storage devices in a log-structured redundant array of inexpensive disks (RAID) scheme. The controller is configured to execute a RAID rebuild operation by: detecting a failure disk among the plurality of solid state data storage devices; selecting one of the plurality of stripes according to a result of the detection; identifying one or more valid pages of data included in one or more normal chunks of data of the selected stripe, and one or more valid pages of data of a lost chunk of data in the selected stripe, where the lost chunk is mapped to the failure disk; recovering the one or more valid pages of the lost chunk in the selected stripe; and copying the recovered one or more valid pages of the lost chunk and the one or more valid page of the normal chunk to a new stripe of the plurality of solid state data storage devices, wherein any invalid pages of the one or more normal chunks or the lost chuck are not copied to the new stripe and are discarded.

BRIEF DESCRIPTION OF THE DRAWINGS

The forgoing and other features of inventive concepts will be described below in more detail with reference to the accompanying drawings of non-limiting example embodiments of inventive concepts in which like reference characters refer to like parts throughout the different views. The drawings are not necessarily to scale, emphasis instead being placed upon illustrating principles of inventive concepts.

FIG. 1 is a block diagram of an example embodiment of a user device.

DETAILED DESCRIPTION

Hereinafter, a solid state drive (SSD) employing a flash memory device will be used as an example to describe features and functions of inventive concepts. The SSD may include a plurality of chunks of data belonging to different stripes. Each of the chunks includes a plurality of pages. Each of the pages may be divided into a valid page that is not updated and an invalid page that is invalidated by an overwrite operation. Throughout the specification, the terms "failure disk" and "failure drive" are used to denote the state of an SSD. The terms failure disk or failure drive mean an SSD in a state in which the SSD is inaccessible due to a connection error or a physical defect. Embodiments of inventive concepts will now be described more fully with reference to accompanying drawings. Also, as is traditional in the field of the inventive concepts, in the description to follow embodiments may be described and illustrated in terms of functional blocks, units and/or modules. These blocks, units and/or modules are physically implemented by electronic circuits such as logic circuits, microprocessors, hard-wired circuits or the like, and may optionally be driven by firmware and/or software. Also, each functional block, unit and/or module of the embodiments may be physically separated into two or more interacting and discrete blocks, units and/or modules without departing from the scope of the inventive concepts. Further, two or more of the functional blocks, units and/or modules of the embodiments may be physically combined into more complex blocks or units without departing from the scope of the inventive concepts.

Figure 1:
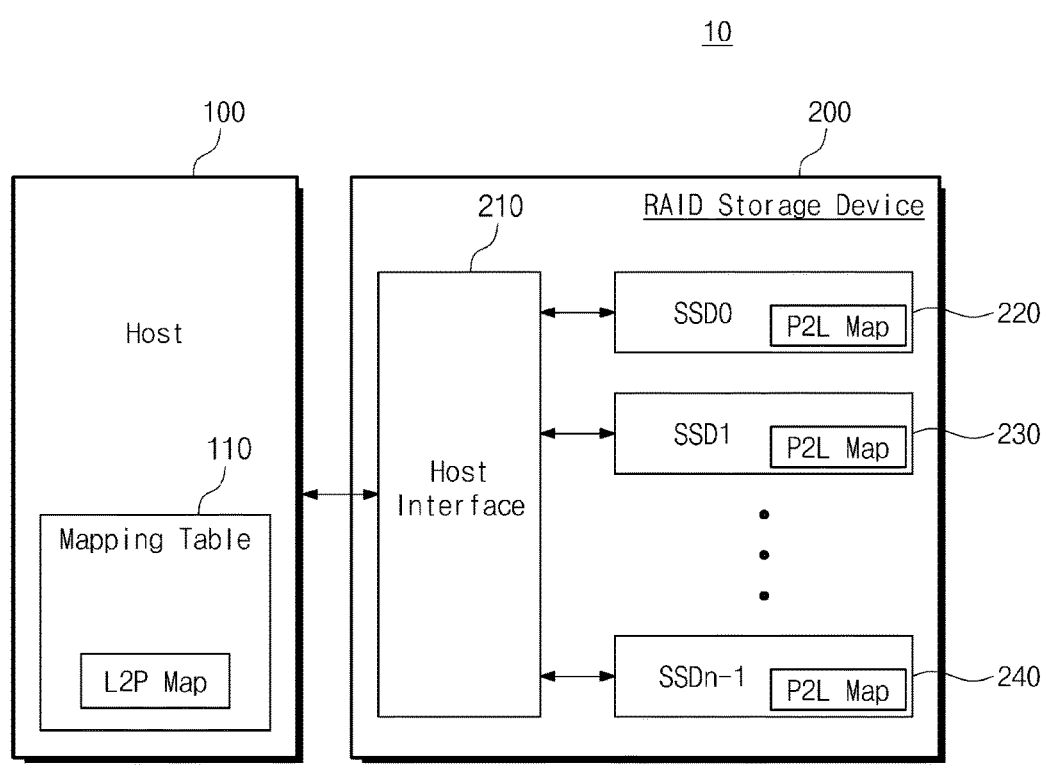

FIG. 1 is a block diagram of an example embodiment of a user device 10. As illustrated, user device 10 includes a host 100 and a RAID storage device 200. User device 10 may be, for example, a server or a data center.

Host 100 accesses RAID storage device 200 to write or read data. Host 100 may provide a command, an address, and data to RAID storage device 200. Host 100 may request data using the command or the address from the RAID storage device 200. For example, host 100 may include at least one processor. Host 100 may be a processor itself or an electronic device or system including a processor.

In particular, host 100 may manage a plurality of solid state drives (SSDs) 220, 230, and 240 included in storage device 200. For example, host 100 may control SSDs 220, 230, and 240 in a log-structured RAID architecture. According to the log-structure RAID architecture, in a single stripe, data are sequentially written in a physical arrangement order irrespective of a logical block address LBA. A mapping relationship between a logic block address LBA and a corresponding physical address is stored and updated in a mapping table 110.

In the log-structure RAID architecture, resources are managed in units of stripes. Write-requested data may be sequentially written into a stripe of an erase state. The following description relates to how to update a single page into which data are sequentially written. Data written into a single page is maintained as it is, and updated data is written into a page of another physical address. Thus, overwrite of data is achieved by updating only mapping information of a physical address corresponding to an updated logical block address. A mapping relationship between the logical block address and the physical address is managed on mapping table 110.

RAID storage device 200 may include a host interface 210 and plurality of solid state drives (SSDs) 220, 230, and 240. Host interface 210 may perform communication between SSDs 220, 230, and 240 and host 100. For example, host interface 210 provides a channel for communication with host 100. Host interface 210 provides physical connection between host 100 and RAID storage device 200. That is, host interface 210 provides an interface with RAID storage device 200 in correspondence with a bus format of host 100. The bus format of host 100 may include at least one of USB (Universal Serial Bus), SCSI (Small Computer System Interface), PCI express, ATA, PATA (Parallel ATA), SATA (Serial ATA), SAS (Serial Attached SCSI), and UFS (Universal Flash Storage).

A RAID, which will be described later, may be defined at various levels. For example, the levels may include at least one of RAID level 0 (Striped set without parity or Striping), RAID level 1 (Mirrored set without parity or Mirroring), RAID level 2 (Hamming code parity), RAID level 3 (Striped set with dedicated parity, bit interleaved parity, or byte level parity), RAID level 4 (Block level parity), RAID level 5 (Striped set with distributed parity or interleave parity), RAID level 6 (Striped set with dual distributed parity), RAID level 7, RAID level 10, and RAID level 53 or a merged RAID level including at least two of the RAID levels given above (e.g., RAID 0+1, RAID 1+0, RAID 5+0, RAID 5+1, or RAID 0+1+5).

Each of SSDs 220, 230, and 240 may include a controller and a plurality of flash memory devices. Mapping or address management at the level of a controller included in each of SSDs 220, 230, and 240 will not be considered in example embodiments. The description of technical features which follows will focus on a log-structured RAID scheme performed by host 100. However, it is to be understood that advantage of inventive concepts disclosed herein is not limited to a storage system of the log-structured RAID scheme.

Host 100 controls RAID storage device 200 in a log-structured RAID scheme. Among SSDs 220, 230, and 240, a failure disk may occur due to various causes. Host 100 performs a RAID rebuild operation using mapping table 110 to recover a chunk stored in a failure disk when the failure disk occurs. The RAID rebuild operation is an operation to recover a chunk of data stored in a failure disk using chunks of disks except for the failure disk. Host 100 does not try to recover an invalid page during a RAID rebuild operation. Meanwhile, host 100 may try to recover a valid page using parity during the RAID rebuild operation. Additionally, when the RAID rebuild operation is completed, host 100 may further perform an operation to copy only a valid page from a corresponding stripe to a new stripe. With the above-described procedure, the number of invalid page copies may decrease significantly.

Figure 2:
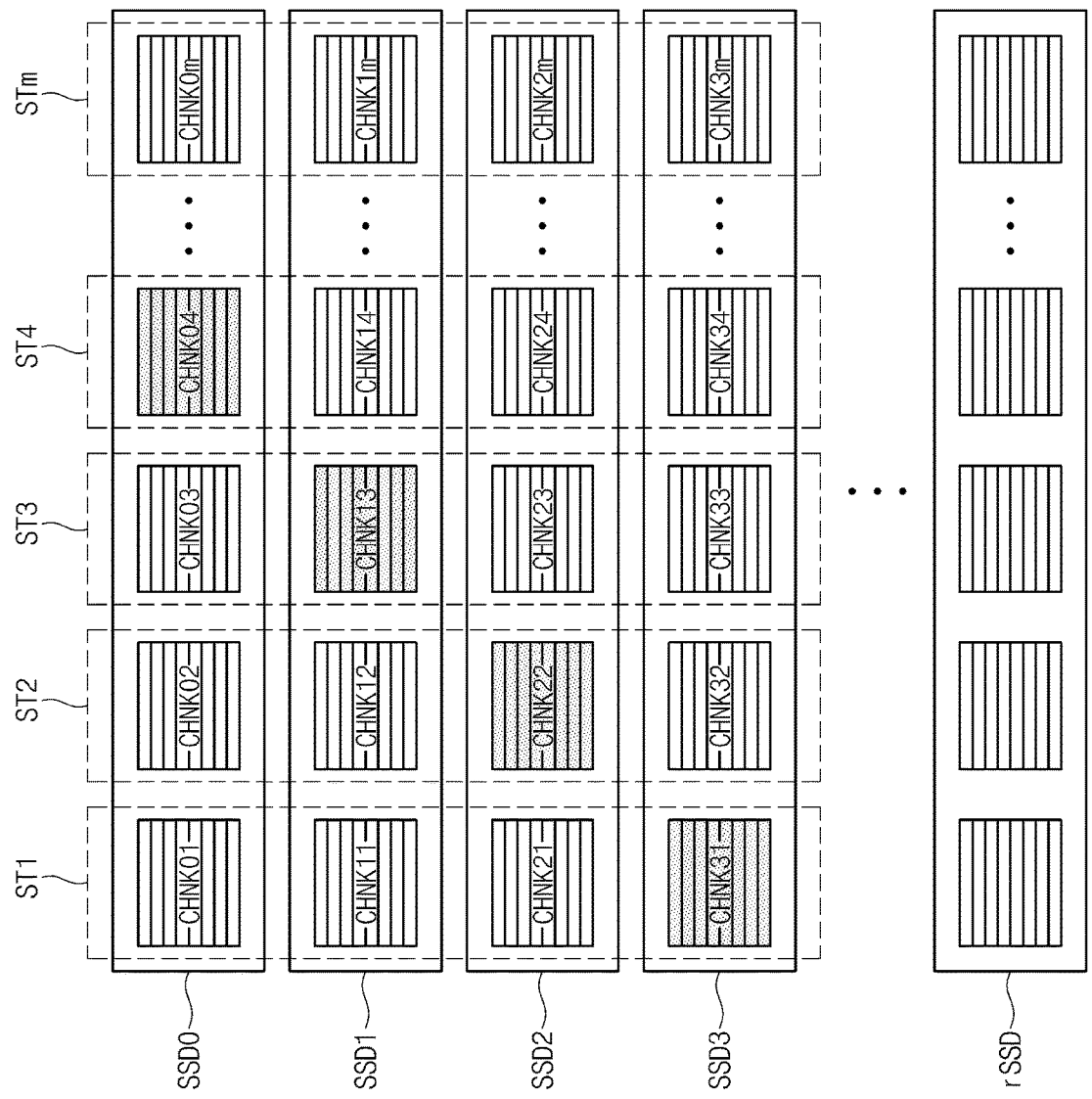
FIG. 2 is a block diagram illustrating an example embodiment of an arrangement for constituting a disk unit RAID.

FIG. 2 is a block diagram illustrating an example embodiment of an arrangement for constituting a disk unit RAID. An example will be described where four solid state drives SSD0, SSD1, SSD2, and SSD3 constitute a disk unit RAID. A RAID storage device 200 may include at least one repair disk rSSD to store a new stripe generated by a RAID rebuild operation performed when a failure disk occurs.

A first stripe ST1 may include a plurality of chunks CHNK01, CHNK11, CHNK21, and CHNK31 that are distributed and stored in the solid state drives SSD0, SSD1, SSD2, and SSD3, respectively. The parity chunk CHNK31 may correspond to parities encoded from the chunks CHNK01, CHNK11, and CHNK21 by host 100. Assuming that each chunk includes eight pages, pages of the parity chunk CHNK31 may encode and generate pages corresponding to the other chunks CHNK01, CHNK11, and CHNK21, respectively. For example, at the RAID level 5 the parity chunk CHNK31 may be generated by an XOR operation between the chunks CHNK01, CHNK11, and CHNK21. According to the above-mentioned arrangement, second to $m^{th}$ stripes ST2, ST3, . . . , and STm may be generated and stored in a corresponding memory area.

In the case that the RAID configuration of a disk or drive unit is employed, even when a single disk fails, a data chunk of the failure disk may be recovered by employing the other chunks in a stripe. For example, when the SSD0 is a failure disk, a chunk CHNK01 of a first stripe ST1 may be recovered using the other chunks CHNK11, CHNK21, and CHNK31. Thus, RAID storage device 200 may ensure high reliability of data.

The repair disk rSSD is a solid state drive to store a result of a RAID rebuild operation performed during detection of a failure disk. That is, the repair disk rSSD may be used to replace a failure disk that cannot be accessible or used any longer. For example, recovered data generated as a result of the RAID rebuild operation due to a failure disk may be stored in stripes including the repair disk rSSD instead of the failure disk.

Figure 3:
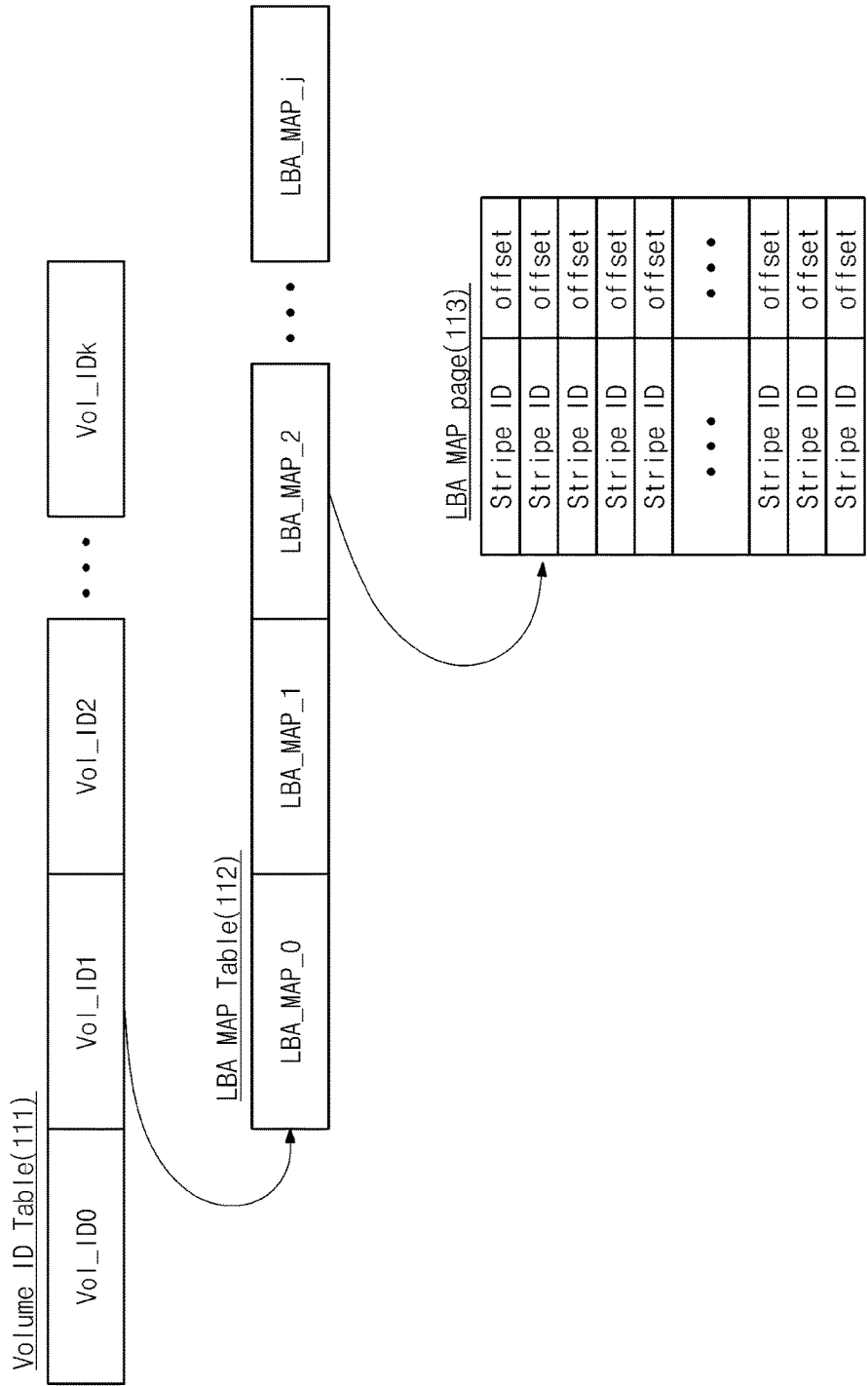
FIG. 3 is a block diagram illustrating an example arrangement for configuring a mapping table in FIG. 1.

FIG. 3 is a block diagram illustrating an example arrangement for configuring mapping table 110 in FIG. 1. Referring to FIG. 3, mapping table 110 may be hierarchically configured to manage a plurality of SSDs in a log-structure RAID scheme.

A volume ID table 111 indicates an allocated specific volume (e.g., specific LBA range) in a linear memory area that a plurality of SSDs 220, 230, and 240 constitute. For example, when a user request an access to a first volume Vol_ID1, an LBA range LBA_MAP_0 to LBA_MAP_j (j being a positive integer) corresponding to the first volume Vol_ID1 may be provided to a user in an LBA map table 112. Entries each corresponding to an LBA are provided to an LBA map page. For example, mapping of a physical address to a logic address range LBA_MPA_2 may be configured in the same form as LBA map page 113. For example, mapping with a logical address of pages included in a certain RAID stripe may be indicated as a stripe ID and an offset, similar to LBA map page 113.

Let's consider the case where first page data of a certain stripe is updated to a second page. In this case, host 100 writes the second page into a physical area different from the first page. Additionally, host 100 may update a managed first page to LBA map page 113 by updating an offset of the first page with a value corresponding to a physical position of a second page. Volume ID table 111, LBA map table 112, and LBA map page 113 may be summarized as a logical-to-physical translation map (hereinafter referred to as "L2P Map"). The L2P Map is a table for mapping a logical address of logical pages managed in mapping table 110 of host 100, to a logical address.

Figure 4:
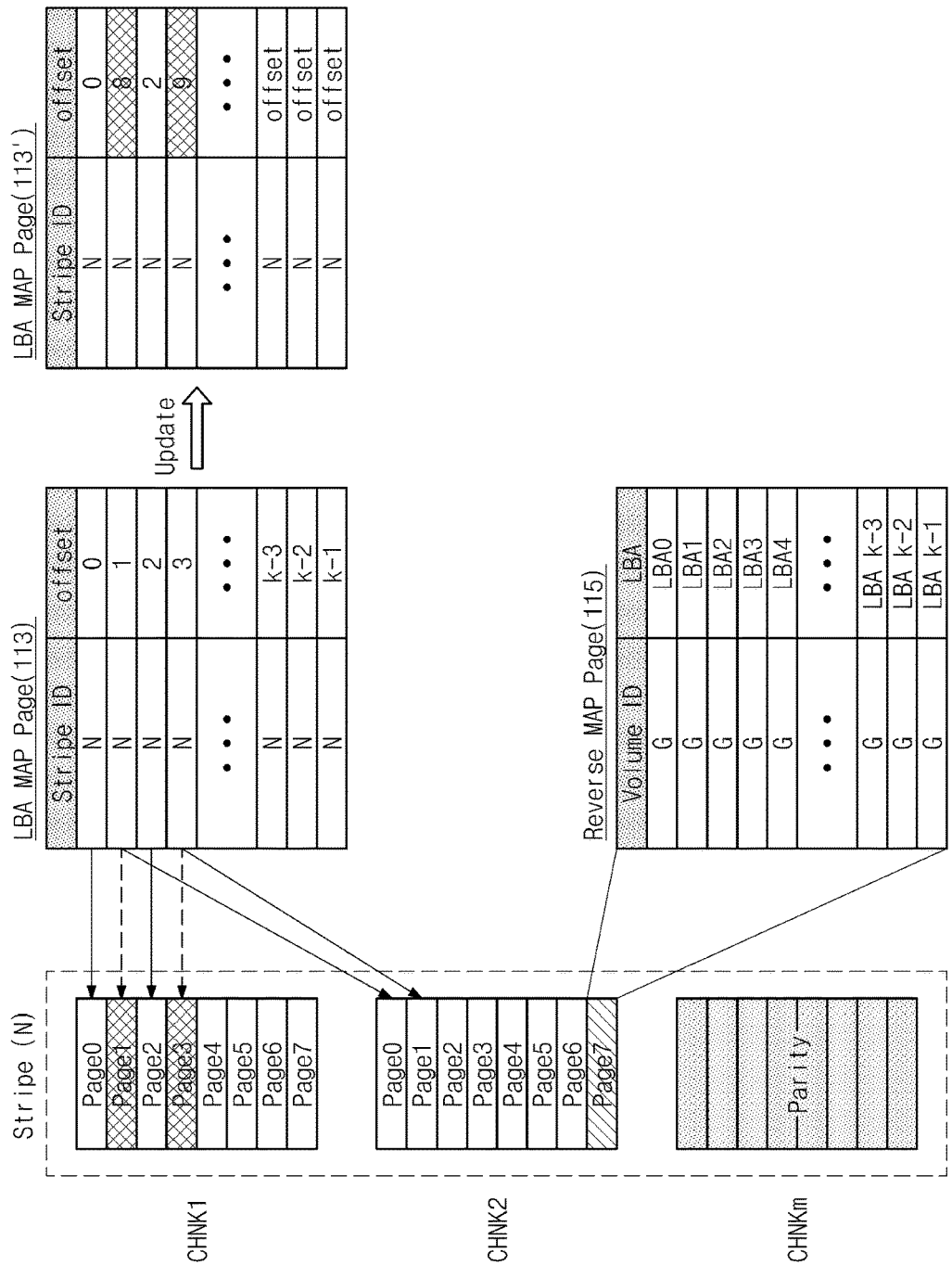
FIG. 4 illustrates an example embodiment of an address mapping method.

FIG. 4 illustrates an example embodiment of an address mapping method. Referring to FIG. 4, selection of a stripe where a stripe ID is N will be assumed to describe a log-structured RAID scheme. Pages included in the selected stripe N may be updated according to an overwrite request of host 100.

When data are all written into pages allocated to the stripe N, a parity chunk CHNKm and a reverse map page 115 may be generated. The parity chunk CHNKm may be encoded and generated in various manners according to a RAID level. In particular, a reverse map page 115 may be summarized as a physical-to-logical translation map (hereinafter referred to as "P2L Map") to map a physical addresses of all physical pages included in the stripe N to a logical address. Reverse map page 115 may maintain initially written information before the stripe N is erased through a garbage collection or merge operation.

When host 100 updates pages Page1 and Page3 of the first chunk CHNK1, data of updated pages may be written into the second chunk CHNK2 of the stripe N. Thus, after update, host 100 changes an offset of LAB map page 113 to update mapping information. When offset information of LAB map page 113 is changed, consistency with the mapping information stored in reverse map page 115 is lost. In example embodiments, an updated page may be checked by comparing LAB map table 113 with reverse map page 115. Thus, a valid page and an invalid page in a certain stripe may be identified using LAB map table 113 and reverse map page 115.

However, a method for identifying a valid page and an invalid page in a certain stripe is not limited to the above. A valid page and an invalid page in a stripe may be identified using various address information and mapping information or in a modified manner.

Figure 5:
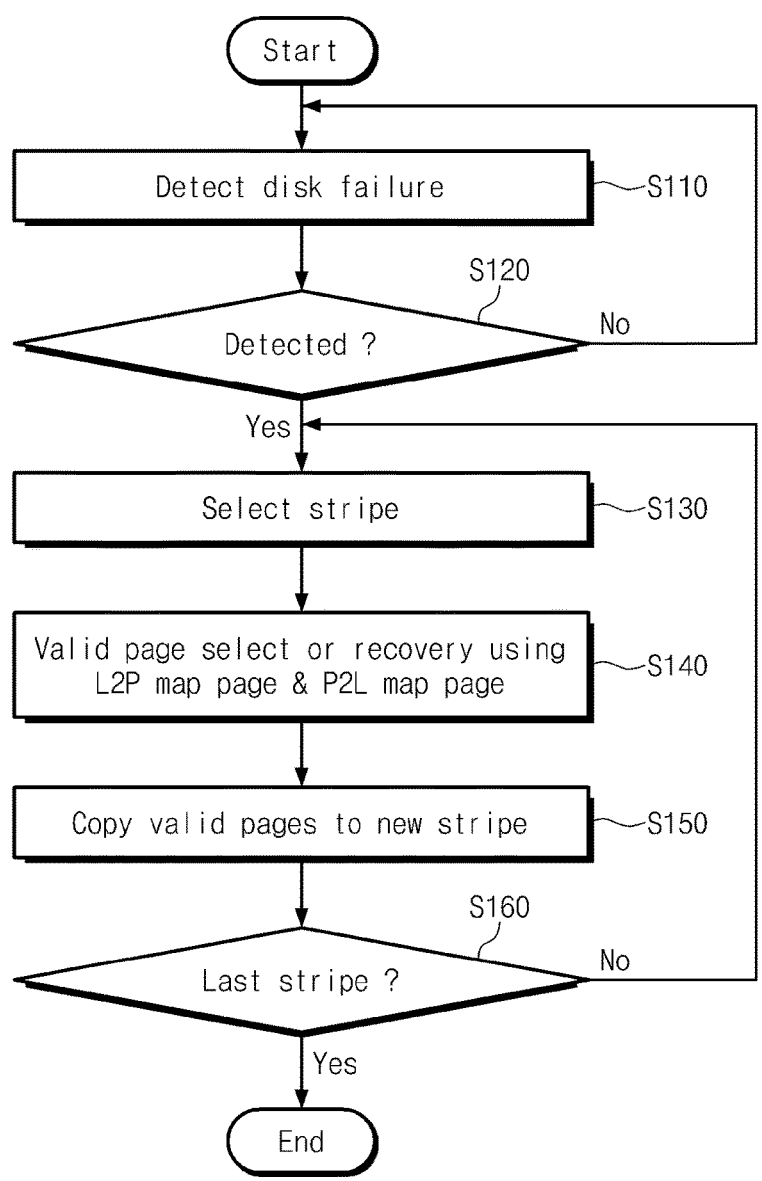
FIG. 5 is a flowchart summarizing an example embodiment of a RAID rebuild operation.

FIG. 5 is a flowchart summarizing an example embodiment of a RAID rebuild operation. Referring to FIG. 5, when a disk failure occurs at one of a plurality of solid state drives managed in a log-structured RAID scheme, a RAID rebuild operation is performed to selectively recover only a valid page.

In an operation S110, host 100 detects whether there is a failure disk among solid state drives (SSDs). For example, host 100 may detect whether there is an inaccessible failure disk or failure drive among the SSDs.

In an operation S120, host 100 performs an operation branch according to a detection result of the failure disk. When no failure disk is detected (No), the flow returns to operation S110. Meanwhile, when a failure disk is detected (Yes), the flow proceeds to an operation S130.

In operation S130, host 100 selects one of a plurality of stripes. Host 100 may sequentially select a stripe including a chunk corresponding to a failure disk among the plurality of stripes.

In an operation S140, host 100 selects a valid page using a logical-to-physical map page (or LBA map page) and a physical-to-logical map page (or reverse map page) corresponding to the selected stripe. For example, among a plurality of pages included in the selected stripe, pages where a logical-to-physical map page and a physical-to-logical map page are different from (do not match) each other may be determined to be invalid pages. Host 100 may select a valid page by selecting pages where a logical-to-physical map page and a physical-to-logical map page are identical to (match) each other. In a case when a reverse map page (reverse MP) is stored in a chunk included in the failure disk, host 100 may recover the chunk including the reverse MP using other chunks and a parity chunk. In that case, host 100 may select a valid page using the recovered reverse MP.

In an operation S150, host 100 copies selected valid pages in the selected stripe to a new stripe that is provided separately. In the selected stripe, page data corresponding to an entry where a logical-to-physical map page (or LBA map page) and a physical-to-logical map page (or reverse map page) are different from (do not match) each other may be determined to be an invalid page. The invalid pages are not copied to the new stripe. A new stripe unit may be configured using a memory area of a repair disk or a repair drive for replacing the failure disk. Data to be stored in the new stripe may include valid pages, a new parity chunk, and a reverse map page. Data to be stored in the new stripe may be stored on a volatile memory such as random access memory (RAM). Data of a single stripe unit including valid pages, a parity chunk, and a new reverse map page may be stored in a new stripe configured using a repair disk.

In an operation S160, a determination is made as to whether the stripe recovered in S150 is the last stripe designated for recovery. When the stripe processed in operation S150 is the last stripe among the plurality of stripes, the overall RAID rebuild flow may be completed. However, when there are one or more additional stripes to be recovered, the flow proceeds to operation S130 to select another stripe.

Described above is a technique for selecting and copying only valid pages to a new stripe during a RAID rebuild operation performed when a failure disk is detected. According to example embodiments, a copy of an invalid page may be blocked or prevented during a RAID rebuild operation to reduce the burden of garbage collection. Moreover, the number of page copies to an invalid page may be reduced to secure sources of the RAID storage device and to extend the life of the RAID storage device.

Figure 6:
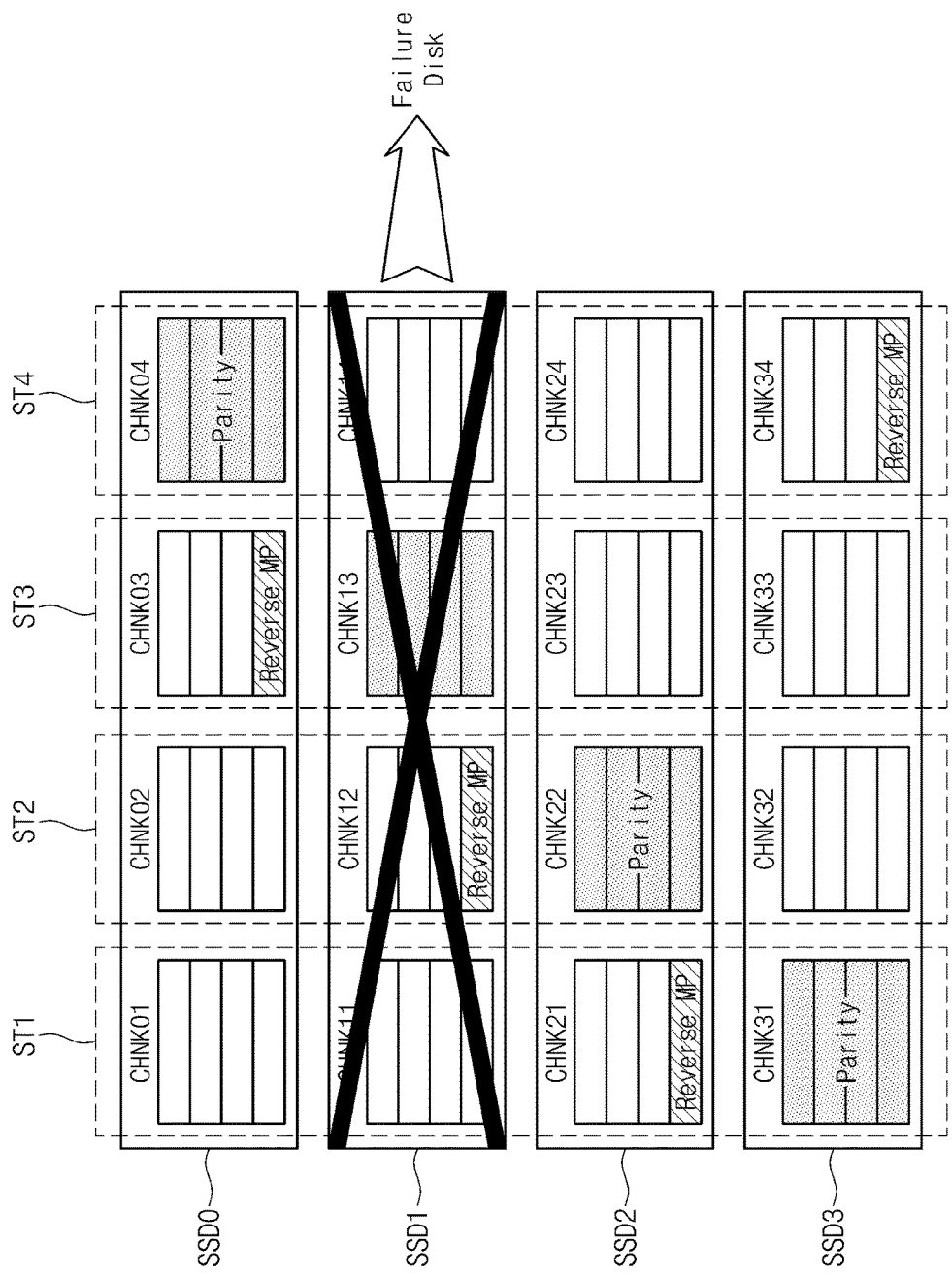
FIG. 6 illustrates an example embodiment of a failure disk that occurs in a log-structured RAID, and a stripe unit rebuild method depending on the occurrence of the failure disk.

FIG. 6 illustrates a failure disk that occurs in an example embodiment of a log-structured RAID, and a stripe unit rebuild method depending on the occurrence of the failure disk. Referring to FIG. 6, an example will be described where in a structure including four solid state drives SSD0, SSD1, SSD2, and SSD3 and four stripes ST1, ST2, ST3, and ST4, the solid state drive SSD1 is detected as a failure disk. In addition, an example will be described where each chunk includes four pages.

The failure disk SSD1 includes chunks CHNK11, CHNK12, CHNK13, and CHNK14 included in the four stripes ST1, ST2, ST3, and ST4. The chunks CHNK11 and CHNK14 include user data, and the chunk CHNK12 includes a reverse map page (reverse MP) of the stripe ST2. The chunk CHNK13 corresponds to a parity chunk generated using each of chunks CHNK03, CHNK23, and CHNK33 of the stripe ST3.

According to a RAID rebuild method described herein, only valid pages may be recovered among the chunks CHNK11, CHNK12, CHNK13, and CHNK14 lost by the failure disk SSD1. Pages identified as invalid pages may not be recovered and may not be copied to a new stripe. According to example embodiments, a valid page and an invalid page are identified using mapping information. That is, only valid pages included in the lost chunks CHNK11, CHNK12, CHNK13, and CHNK14 may be recovered, by comparing an LBA map page with a reverse map page and determining the pages which match each other to be valid pages, and the entries which do not match each other to be invalid pages. Additionally, only valid pages included in each stripe may be copied to the new stripe. This procedure will be described in detail later with reference to accompanying drawings.

Figure 7:
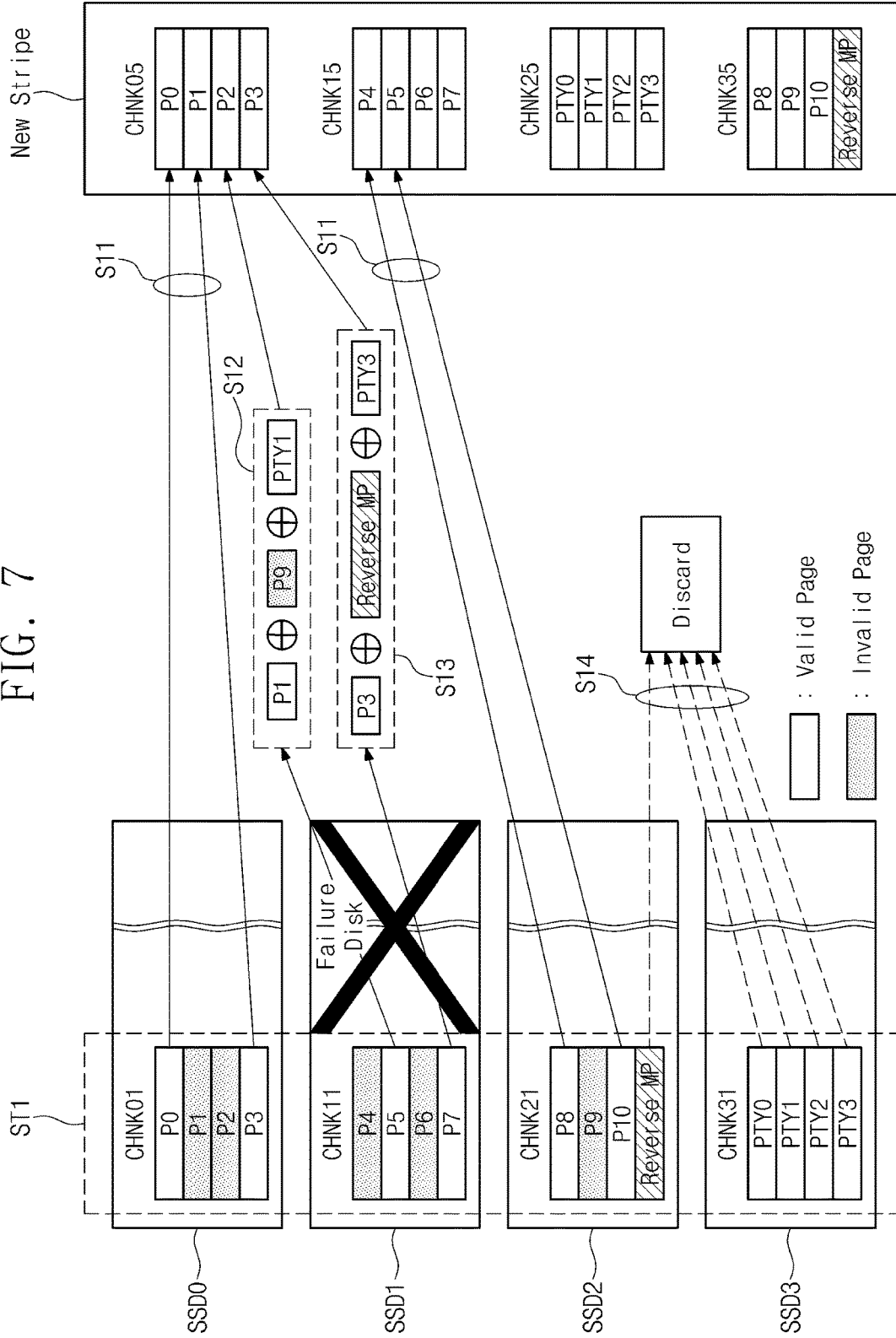
FIG. 7 illustrates an example embodiment of a rebuild method for a stripe when a failure disk occurs.

FIG. 7 illustrates an example embodiment of a rebuild method for a stripe ST1 when a failure disk occurs for solid state drive SSD1. Referring to FIG. 7, the stripe ST1 includes four chunks CHNK01, CHNK11, CHNK21, and CHNK31. The chunk CHNK11 is allocated to the solid state drive SSD1 and corresponds to a lost chunk.

In this example: valid pages P0 and P3 and invalid pages P1 and P2 are considered to be included in the chunk CHNK01 allocated to the solid state drive SSD0; valid pages P8 and P10 and an invalid page P9 are considered to be included in the chunk CHNK21 allocated to the solid state drive SSD2; a reverse map page (reverse MP) is also stored in the chunk CHNK21; and parity pages PTY0, PTY1, PTY2, and PTY3 are considered to be included in the chunk CHNK31 allocated to the solid state drive SSD3.

Host 100 reads the reverse MP stored in the chunk CHNK21, and compares the read reverse MP with an LAB map page configured on mapping table 110. As a result of the comparison, pages having different entry values (do not match) are identified as invalid pages. For example, pages P1, P2, P4, P6, and P9 stored in the stripe ST1 may be identified as invalid pages. Since the reverse MP assigned to solid state drive SSD2 has already accomplished its purpose for identifying a valid page, the reverse MP need not be copied to a new stripe. Accordingly, although the reverse MP is recovered in each of the stripes ST1, ST2, ST3, and ST4, the reverse MP need not be copied to the new stripe.

When the identification of a valid page or an invalid page is completed, valid pages are copied to a new stripe. The copy to the new stripe may include an operation of buffering the valid pages to a memory, such as random access memory (RAM), and an operation of generating a new reverse MP and a parity chunk (e.g., CHNK25) for the buffered valid pages, as described above. Data of a stripe unit including chunks CHNK05, CHNK15, and CHNK35 constituted by valid pages, and a reverse MP corresponding to a new stripe, may be constituted. Then, data of a stripe unit constituted in the memory, such as a RAM, may be copied to the new stripe.

The procedure is indicated in FIG. 7 by the arrows labeled S11. Valid pages P0, P3, P8, and P10 included in "unlost" chunks CHNK01 and CHUNK21 may be copied to the new stripe without a separate recovery procedure. That is, the valid pages P0 and P3 may be copied to the chunk CHNK05 of the new stripe, and the valid pages P8 and P10 may be copied to the chunk CHNK15 of the new stripe.

However, the valid pages P5 and P7 existing in the lost chunk CHNK11 may be copied to the new stripe after undergoing a recovery procedure using parity. For example, the valid page P5 included in the lost chunk CHNK11 is recovered using the invalid page P1 of the chunk CHNK01, the invalid page P9 of the chunk CHNK21, and the parity page PTY1 of the chunk CHNK31. That is, the lost valid page P5 may be recovered through an XOR operation of the pages P1 and P9 and the parity page PTY1. This procedure is indicated in FIG. 7 by the label S12. The recovered valid page P5 is copied to the chunk CHNK05 of the new stripe. However, it is to be understood that the recovery method using parity may vary depending on an applied RAID level.

The valid page P7 included in the lost chunk CHNK11 is recovered using the valid page P3 of the chunk CHNK01, the reverse MP of the chunk CHNK21, and the parity page PTY3 of the chunk CHNK31. That is, the lost valid page P7 may be recovered through an XOR operation of the pages P1 and reverse MP and the parity page PTY3. This recovery procedure is indicated in FIG. 7 by the label S13. The recovered valid page P7 is copied to the chunk CHNK05 of the new stripe.

The invalid pages P1, P2, P4, P6, and P9 may be used to recover a valid page of a lost chunk. However, copy of the invalid pages P1, P2, P4, P6, and P9 to the new stripe does not occur. Since the reverse MP including mapping information on the stripe ST1 is not meaningful in the new stripe any longer, the reverse MP may not be copied, but instead be discarded. The parity pages PTY0, PTY1, PTY2, and PTY3 included in the parity chunk CHNK31 also need not be copied to the new stripe. This is because the parity pages PTY0, PTY1, PTY2, and PTY3 are metadata on the stripe and are not meaningful in the new stripe. Thus, the parity pages PTY0, PTY1, PTY2, and PTY3 may be discarded. The discard procedure of the reverse MP and the parity pages PTY0, PTY1, PTY2, and PTY3 is indicated in FIG. 7 by the label S14.

Valid pages may be copied from the plurality of stripes ST1, ST2, ST3, and ST4 to a new stripe constituted using a repair disk for replacing a failure disk. A new parity chunk (e.g., CHNK25) generated using the valid pages and a new reverse MP (stored in CHNK35) may be stored in a new stripe.

Figure 8:
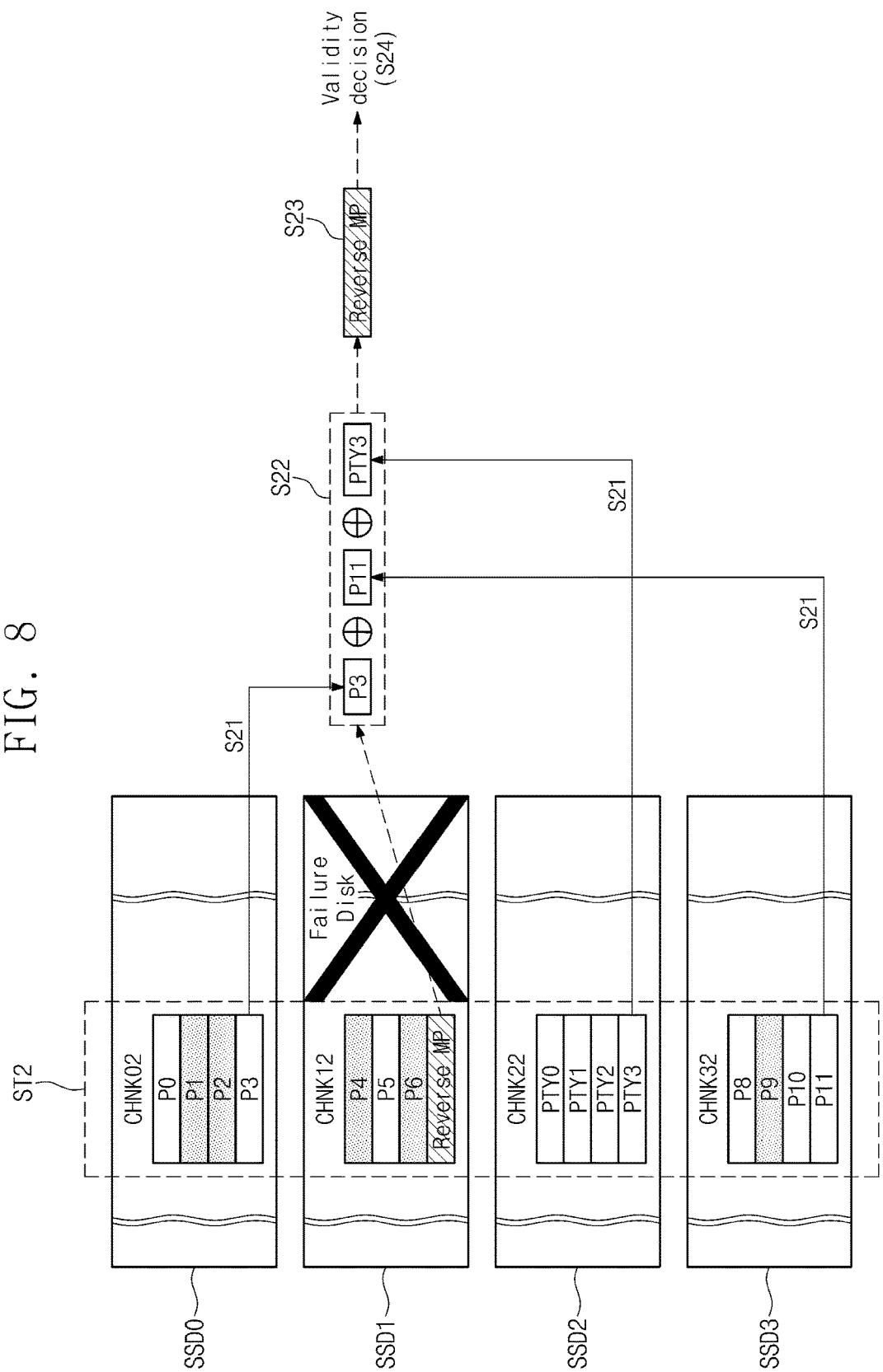
FIG. 8 illustrates an example of a rebuild method for recovering a reverse map page indicating a physical-to-logical address mapping relationship.

FIG. 8 illustrates an example of a RAID rebuild method for recovering a reverse map page indicating a physical-to-logical address mapping relationship from a failure disk. Referring to FIG. 8, a stripe ST2 includes four chunks CHNK02, CHNK12, CHNK22, and CHNK32. The chunk CHNK12 is allocated to a solid state drive SSD1 corresponding to a failure disk. For this reason, the chunk CHNK12 corresponds to a lost chunk. Here, a reverse map MP is assigned to the lost chunk CHNK12.

In this example: valid pages P0 and P3 and invalid pages P1 and P2 are considered to be included in the chunk CHNK02 allocated to a solid state drive SSD0; a valid page P5, a reverse MP, and invalid pages P4 and P6 may be included in the chunk CHNK12 allocated to the solid state drive SSD1 corresponding to the failure disk; and valid pages P8, P10, and P11 and an invalid page P9 may be included in the chunk CHNK32.

When detecting that a failure disk exists, in an example embodiment host 100 reads a logical-to physical address translation map (L2P Map) and a physical-to-logical address translation map (P2L Map) to perform a RAID rebuild operation. That is, host 100 may read an LBA map page 113 (see FIG. 3) updated from a host as an L2P Map up to now from a memory in which mapping table 110 is stored. Host 100 should read the reverse MP written into the stripe ST2 as a P2L Map. However, the reverse MP is written into the lost chunk CHNK12. Thus, the reverse MP, that is the P2L Map, should be restored to determine whether all pages of the stripe ST2 are valid or invalid.

In S21, host 100 may read the pages P3, PTY3, and P11 of the normal chunks CHNK02, CHNK22, and CHNK32 to recover the reverse MP. Host 100 may read the pages P3, PTY3, and P11 with reference to an offset of the lost chunk CHNK12 in which the reverse MP is stored. In this case, it is not necessary to consider whether the pages read to recover the reverse MP are valid or invalid. This is because validity of the pages should be determined after the reverse MP is recovered.

In S22, host 100 performs a recovery operation on the pages P3, PTY3, and P11 read from unlost chunks. For example, in the case of RAID Level 5, an XOR operation between the pages P3, PTY3, and P11 may be applied to recover the reverse MP. However, it is to be understood that various schemes may be applied to recover a lost page in a RAID scheme of a different level.

In S23, the reverse MP is recovered through a recovery operation of the pages P3, PTY3, and P11. The recovered reverse MP may be temporarily stored in storage device 200 or a separate storage space in host 100.

In S24, host 100 may identify a valid page and an invalid page by comparing the recovered reverse MP with an LBA map page maintained on mapping table 110, and identifying a valid page as one where the reverse MP and the LBA page match, and identifying an invalid page as one where the reverse MP and the LBA page do not match. When identification of a valid or invalid property of all pages in the selected stripe ST2 is completed, a RAID rebuild operation may be performed in the same way as described with reference to FIG. 7. That is, only valid pages may be selected and copied to a new stripe.

In the above, there has been described an example of an operation of recovering information (e.g., reverse MP) for identifying a valid page and an invalid page when the information is stored in a lost chunk.

Figure 9:
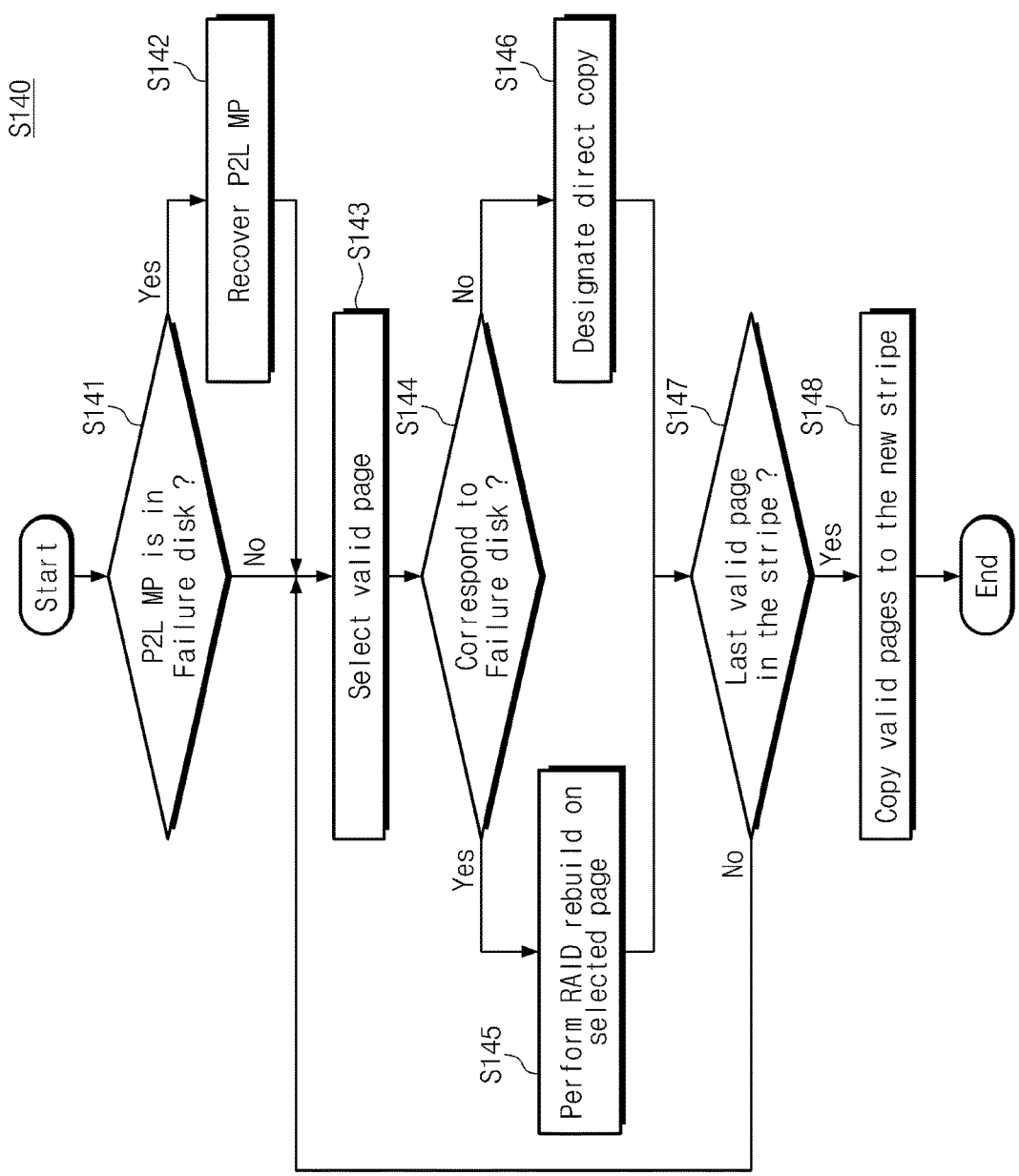
FIG. 9 is a detailed flowchart of operation S140 in FIG. 5.

FIG. 9 is a detailed flowchart of operation S140 in FIG. 5. Referring to FIG. 9, a detection may be made first as to whether information for identifying valid property of a page is included in a lost chunk. When a stripe for applying a rebuild operation is selected in operation S130 of FIG. 5, then operation S141 is commenced.

In an operation S141, host 100 may try to read address mapping information of the selected stripe. The address mapping information includes a logical-to-physical translation (L2P map page) and a physical-to-logical translation map (P2L map page). An LBA map page corresponding to the L2P map page is mapping information that is continuously updated in host 100. However, a reverse map page corresponding to the P2L map page is not updated until a point at which a corresponding stripe exists. At this point, host 100 determines whether the P2L map page is included in a lost chunk. That is, host 100 determines whether the reverse map page is stored in a failure disk. When it is determined that the P2L map page is stored in the lost chunk (Yes), the flow proceeds to an operation S142. Meanwhile, when it is determined that the P2L map page is stored in an unlost (normal) chunk (No), the flow proceeds to an operation S143.

In operation S142, host 100 recovers the P2L map page, for example according to the manner described above with reference to FIG. 8. That is, host 100 may read pages of unlost chunks to perform an operation for recovering the reverse MP.

In operation S143, host 100 may identify valid pages in the selected stripe by comparing the L2P map page with the P2L map page. That is, in a page entry of the L2P map page, a page having a different value than (does not match) pages of the P2L map page may be determined to be an invalid page. In the page entry of the P2L map page, pages maintained at the same value as pages of the P2L map page may be determined to be valid pages. Host 100 selects valid pages among the pages of the selected stripe.

In an operation S144, host 100 determines whether a position of the selected valid page corresponds to a lost chunk. This is because a valid page included in the lost chunk should be recovered through a RAID rebuild operation. That is, when the selected page is included in the lost chunk (Yes), the flow proceeds to an operation S145. Meanwhile, when the selected page is included not in the lost chunk but in a normal chunk (No), the flow proceeds to an operation S146.

In operation S145, host 100 performs a RAID rebuild operation to recover the selected page. That is, host 100 may read pages including parity from "unlost" chunks and may apply the RAID rebuild operation to read page data. Then recovery of a valid page included in the lost chunk is completed. The recovered page may be stored temporarily in a preliminary or buffer memory (e.g., RAM). In operation S146, host 100 may recognize the selected page as a valid page of the unlost chunks. Then host 100 may designate the selected page to be directly copied to a new stripe without separate processing.

In an operation S147, host 100 determines whether all valid pages are selected in the selected stripe. When a valid page further exists in the selected stripe (No), the flow may return to operation S143. In operation S143, a new valid page is selected. Meanwhile, when a valid page does not exist in the selected stripe any longer (Yes), the flow may proceed to an operation S148.

In operation S148, host 100 may copy all valid pages in the selected stripe to a preliminary new stripe. At this point, pages belonging to the parity chunk or the P2L map page are not included in the valid pages. For copying to a new stripe, host 100 organizes data of a stripe unit using all valid pages. Then, host 100 may allocate the valid pages in units of chunks and generate a parity chunk corresponding to each chunk. Host 100 may generate a physical-to-logical translation map (P2L map page or reverse map page) corresponding to a new stripe. The valid pages, the parity chunk, and the P2L map page may be written into the new stripe using a repair disk. In the above, there has been a recovery and management method of a physical-to-logical translation map (P2L map page), or a reverse map page, for identifying a valid or invalid page. A logical-to-physical translation map (L2P map page) and a physical-to-logical translation map (P2L map page) should be obtained to perform a RAID rebuild operation according to example embodiments. This is because when the P2L map page stored in RAID storage device 200 is disposed at a lost chunk, the P2L map page should be recovered in advance.

Figure 10:
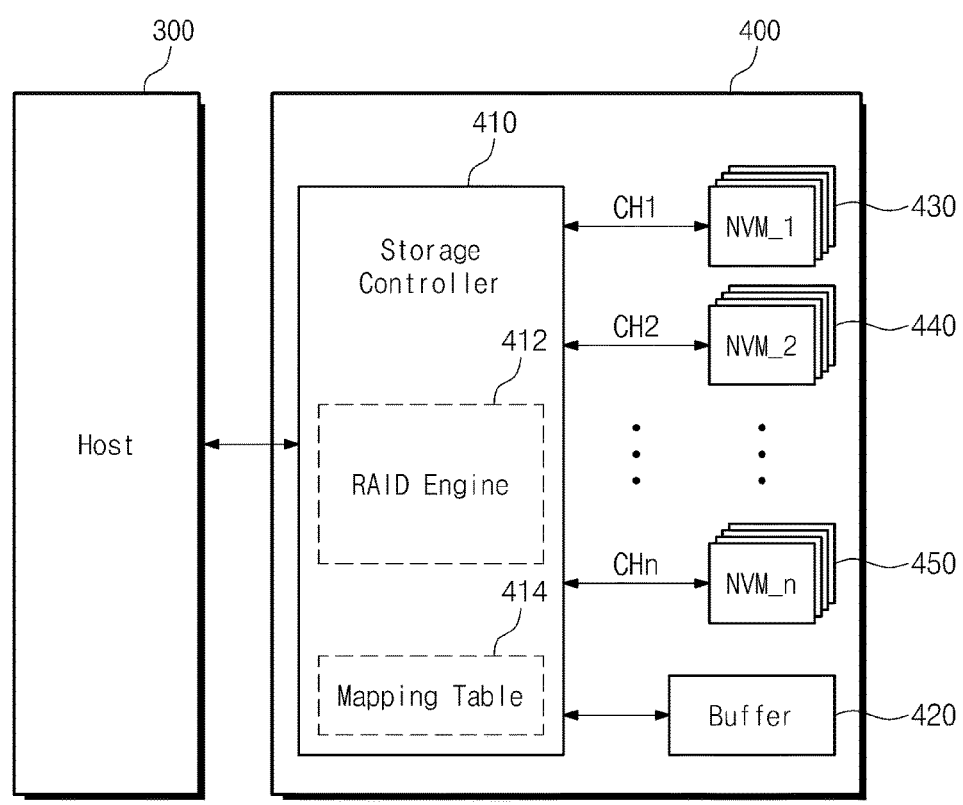
FIG. 10 is a block diagram of an example embodiment of a RAID storage system.

FIG. 10 is a block diagram of an example embodiment of a RAID storage system. As illustrated, the RAID storage system includes a host 300 and a RAID storage device 400. RAID storage device 400 may include a storage controller 410 configured to perform a RAID rebuild operation according to example embodiments described above, a buffer 420, and nonvolatile memory devices 430, 440, and 450.

Host 300 may write data into the RAID storage device 400 and read data stored in the RAID storage device 400. Host 300 may provide a command, an address, and data to RAID storage device 400. Host 300 may request data using the command or the address from RAID storage device 400. For example, host 300 may include at least one processor. Host 300 may be a processor itself, or a system such as an electronic device or a server which includes a processor.

Storage controller 410 may manage nonvolatile memory (NVM) devices NVM_1 430, NVM_2 440, ... and NVM_n 450 in a RAID scheme implemented by a chip or die unit. Storage controller 410 may perform a RAID rebuild operation when a failure occurs in a certain nonvolatile memory device constituting a stripe. That is, valid pages may be selected during recovery of a stripe and the may be copied to a new stripe. Storage controller 410 may include a RAID engine 412 configured to perform a RAID rebuild operation according to example embodiments, and a mapping table 414 configured to support address mapping of a log-structured RAID scheme.

RAID engine 412 may perform a RAID rebuild operation to copy only valid pages to a new stripe when a stripe is recovered due to a device failure that occurs in one of nonvolatile memory devices 430, 440, and 450. RAID engine 412 may perform the above-described RAID rebuild operation by referring to mapping information of mapping table 414 and/or by reading a reverse map page stored in nonvolatile memory devices 430, 440, and 450. For example, RAID engine 412 may compare the L2P map page with the P2L map page to determine pages having the same entry to be valid pages. In addition, RAID engine 412 may perform even a garbage collection function by selecting only the valid pages and copying the selected valid pages to the new stripe during the RAID rebuild operation. In example embodiments, storage controller 410 and nonvolatile memory devices 430, 440, and 450 may be integrated into a single semiconductor device.

Figure 11:
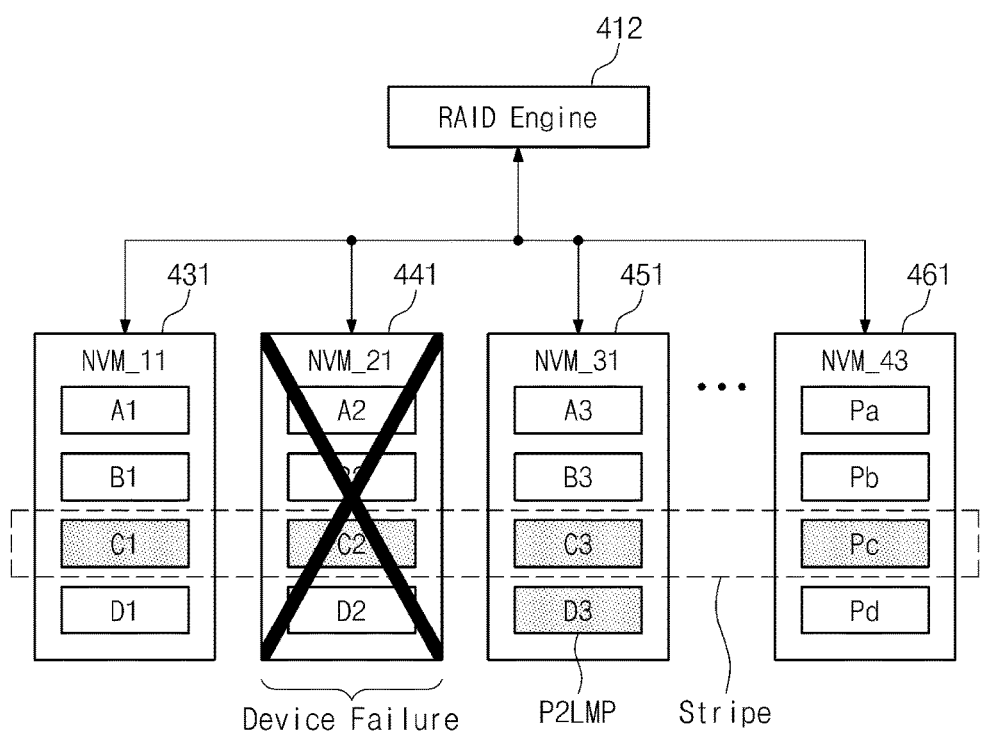
FIG. 11 illustrates an example of a RAID rebuild operation which may be performed by a RAID engine in the RAID storage system of FIG. 10.

FIG. 11 illustrates an example of a RAID rebuild operation which may be performed by RAID engine 412 in FIG. 10. Referring to FIG. 11, RAID engine 412 may control a RAID operation of a device unit (or chip unit) on nonvolatile memory devices 431, 441, 451, and 461.

RAID engine 412 processes data in units of stripes. For example, a single stripe is divided into chunks that are stored in nonvolatile memory (NVM) devices NVM_11 431, NVM_21 441, NVM_31 451, . . . and NVM_43 461, respectively. One of the chunks may include one or more RAID parities Pa, Pb, Pc, and Pd generated using the other chunks. When a certain nonvolatile memory device is detected to have failed, RAID engine 412 may perform the RAID rebuild operation to recover a single stripe. Although it is shown in FIG. 11 that RAID parities Pa, Pb, Pc, and Pd are stored to be concentrated in one of nonvolatile memory devices (e.g., NVM_43 461), example embodiments are not limited thereto. That is, the RAID parities Pa, Pb, Pc, and Pd may be distributed and stored in nonvolatile memory devices 431, 441, 451, and 461, respectively.

RAID engine 412 divides data write-requested from host 300 in units of chunks. RAID engine 412 may distribute and store divided chunks in a plurality of storage devices. One or more parity chunks may be included in one of the divided chunks. Since it is unlikely that an error would occur in a plurality of storage devices at the same time, the reliability of the stored data may be improved by RAID engine 412.

In the case that the RAID configuration is employed, although a single chunk stored in a single nonvolatile memory device is lost, the lost chunk may be recovered through a RAID rebuild operation. In particular, RAID engine 412 may map an address of stripes in a log-structured manner. When a device failure occurs in nonvolatile memory device 441, a valid page may be selected by comparing the L2P map page and the P2L map page of mapping table 414 with each other. RAID engine 412 may perform both a RAID rebuild operation and a garbage collection operation by selecting only valid pages and copying the selected valid pages to a new stripe.

Figure 12:
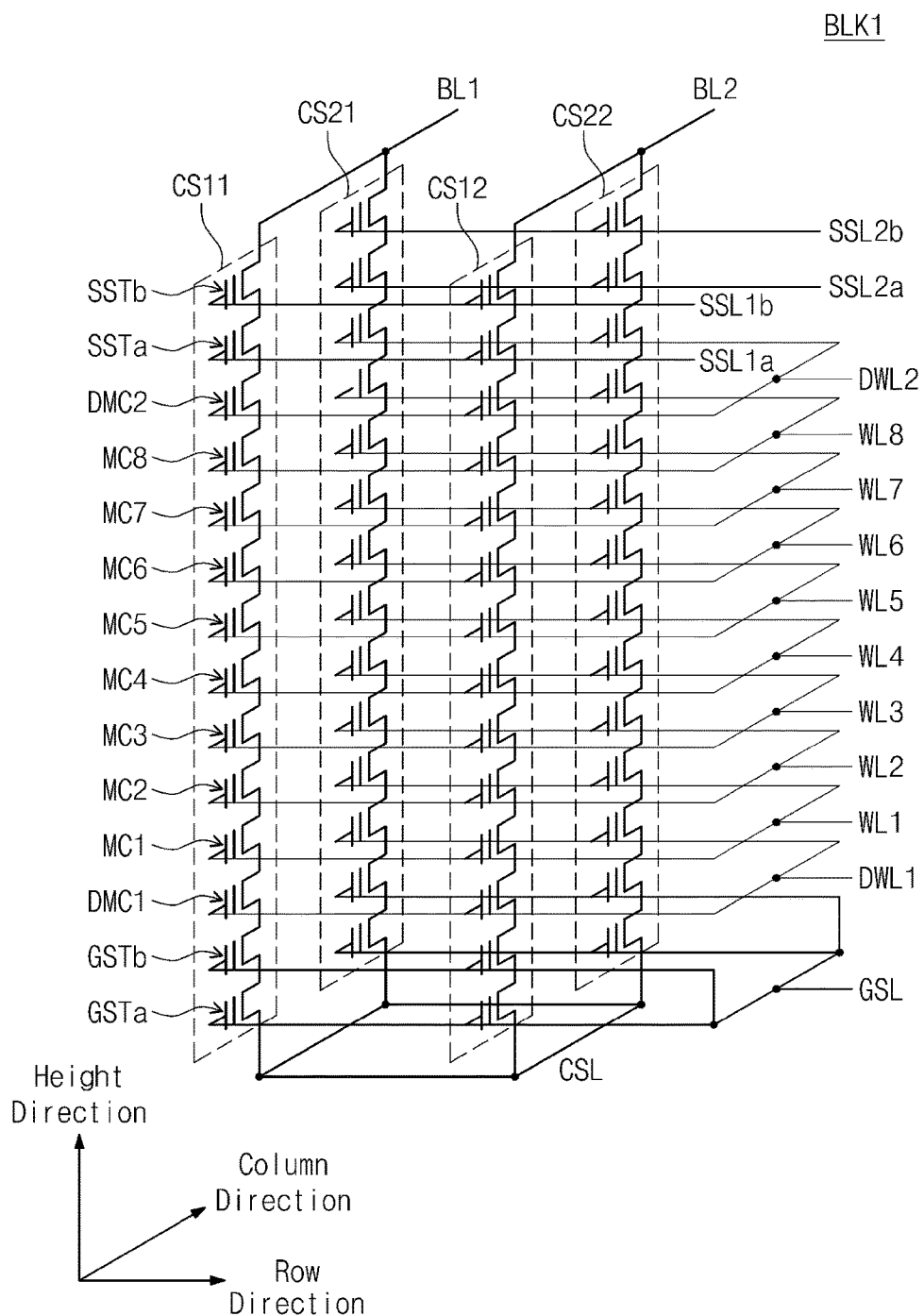
FIG. 12 is a circuit diagram illustrating an example of a first memory block among memory blocks included in an example embodiment of a storage device.

FIG. 12 is a circuit diagram illustrating an example of a first memory block BLK1 among memory blocks included in an example embodiment of a storage device. The first memory block BLK1 includes a plurality of cell strings CS11 to CS21 and CS12 to CS22. The cell strings CS11 to CS21 and CS12 to CS22 may be arranged in a row direction and a column direction to form rows and columns.

For example, the cell strings CS11 and CS12 may be connected to string selection lines SSL1a and SSL1b to form a first row. The cell strings CS21 and CS22 may be connected to string selection lines SSL2a and SSL2b to form a second row.

For example, the cell strings CS11 and CS21 may be connected to a first bitline BL1 to form a first column, and the cell strings CS12 and CS22 may be connected to a second bitline BL2 to form a second column.

Each of the cell strings CS11, CS12, CS21, and CS22 may include a plurality of cell transistors. For example, each of the cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2. In example embodiments, each of cell transistors included in the cell strings CS11, CS12, CS21, and CS22 may be charge trap flash (CTF) memory cells.

The memory cells MC1 to MC8 are serially connected and are stacked in a height direction perpendicular to a plane formed by a row direction and a column direction. The string selection transistors SSTa and SSTb are connected in series, and the serially connected string selection transistors SSTa and SSTb are provided between the memory cells MC1 to MC8 and a bitline BL. The ground selection transistors GSTa and GSTb are serially connected, and the serially connected ground selection transistors GSTa and GSTb are provided between the memory cells MC1 to MC8 and a common source line CSL.

In example embodiments, the first dummy cell DMC1 may be provided between the memory cells MC1 to MC8 and the ground selection transistors GSTa and GSTb. In example embodiments, the second dummy memory cell DMC2 may be provided between the memory cells MC1 to MC8 and the string selection transistors SSTa and SSTb.

The ground selection transistors GSTa and GSTb of the cell strings CS11, CS12, CS21, and CS22 may be commonly connected to a ground selection line GSL. In example embodiments, ground selection transistors of the same row may be connected to the same ground selection line and ground selection transistors of different rows may be connected to different ground selection lines. For example, first ground selection transistors GSTa of cell strings CS11 and CS12 of a first row may be connected to a first ground selection line, and first ground selection transistors GSTa of cell strings CS21 and CS22 of a second row may be connected to a second ground selection line.

Although not shown in FIG. 12, in example embodiments ground selection transistors provided at the same height from a substrate (not shown) may be connected to the same ground selection line, and ground selection transistors provided at different heights from the substrate may be connected to different ground selection lines. For example, the first ground selection transistors GSTa of the cell strings CS11, CS12, CS21, and CS22 may be connected to a first ground selection line, and the second ground selection transistors GSTb thereof may be connected to a second ground selection line.

Memory cells at the same height from the substrate (or the ground selection transistors GSTa and GSTb) are commonly connected the same wordline, and memory cells at different heights are connected to different wordlines. For example, memory cells MC1 to MC8 of the cell strings CS11, CS12, CS21, and CS22 are commonly connected to first to eighth wordlines WL1 to WL8, respectively.

Among the first string selecting transistors SSTa at the same height, string selection transistors of the same row are connected to the same string selection line and string selection transistors of different rows are connected to different string selection lines. For example, first string selection transistors SSTa of the cell strings CS11 and CS12 of the first row are commonly connected to the string selection line SSL1a, and first string selection transistors SSTa of the cell strings CS21 and CS22 of the second row are commonly connected to the string selection line SSL2a.

Similarly, among the second string selecting transistors SSTb at the same height, string selection transistors of the same row are connected to the same string selection line and string selection transistors of different rows are connected to different string selection lines. For example, second string selection transistors SSTb of the cell strings CS11 and CS12 of the first row are commonly connected to the string selection line SSL1b, and second string selection transistors SSTb of the cell strings CS21 and CS22 of the second row are commonly connected to the string selection line SSL2b.

Although not shown in FIG. 12, string selection transistors of cell strings of the same row may be connected to the same string selection line. For example, first and second string selection transistors SSTa and SSTb of the cell strings CS11 and CS12 of the first row may be commonly connected to the same string selection line. The cell strings CS21 and CS22 and the first and second string selection transistors SSTa and SSTb of the second row may be commonly connected to the same string selection line.

In example embodiments, dummy memory cells at the same height are connected commonly to a same dummy wordline, and dummy memory cells of different heights are connected to different dummy wordlines. For example, first dummy memory cells DMC1 are connected to a first dummy wordline DWL1, and second dummy memory cells DMC2 are connected to a second dummy wordline DWL2.

In the first memory block BLK1, read and write operations may be performed in units of rows. For example, a single row of memory block BLK1 may be selected by the string selection lines SSL1a, SSL1b, SSL2a, and SSL2b. For example, when the string selection lines SSL1a and SSL1b are supplied with a turn-on voltage and the string selection lines SSL2a and SSL2b are supplied with a turn-off voltage, the cell strings CS11 and CS12 of the first row are connected to the bitlines BL1 and BL2, respectively. When the string selection lines SSL2a and SSL2b are supplied with a turn-on voltage and the string selection lines SSL1a and SSL1b are supplied with a turn-off voltage, the cell strings CS21 and CS22 of the second row are connected to the bitlines BL1 and BL2, respectively. Among memory cells of a cell string of a row driven by driving a wordline, memory cells of the same height are selected. Read and write operations may be performed on the selected memory cells. The selected memory cells may form a physical page unit.

In the first memory block BLK1, an erase operation may be performed in units of memory blocks or sub-blocks. When an erase operation is performed in units of memory blocks, all memory cells MC of the first memory block BLK1 are simultaneously erased according to a single erase request. When an erase operation is performed in units of sub-blocks, some of memory cells MC of the first memory block BLK1 are simultaneously erased according to a single erase request and other memory cells MC of the first memory block BLK1 are erase-inhibited. A wordline connected to memory cells to be erased may be supplied with a low voltage (e.g., ground voltage), and a wordline connected to erase-inhibited memory cells may be floated.

The first memory block BLK1 shown in FIG. 12 is merely exemplary, the number of cell strings may increase or decrease, and the number of rows and columns constituted by cell strings may increase or decrease according to the number of the cell strings. Moreover, the number of cell transistors GST, MC, DMC, SST, and the like of the first memory block BLK1 may increase or decrease, and height of the first memory block BLK1 may increase or decrease according to the number of the cell transistors. The number of lines (GSL, WL, DWL, SSL, etc.) connected to the cell transistors may increase or decrease according to the number of the cell transistors.

Figure 13:
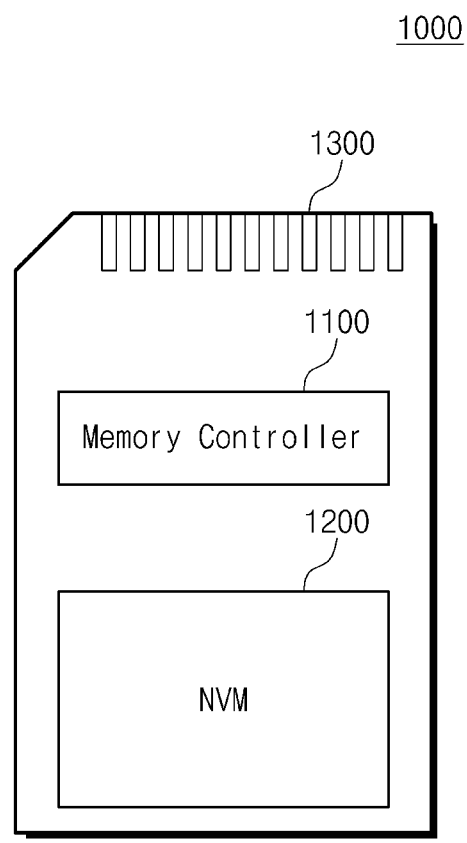
FIG. 13 is a block diagram of a memory card system to which example embodiments of a nonvolatile memory system is applied.

FIG. 13 is a block diagram of a memory card system 1000 to which example embodiments of a nonvolatile memory system is applied. As illustrated, memory card system 1000 includes a memory controller 1100, a nonvolatile memory (NVM) 1200, and a connector 1300.

Memory controller 1100 is connected to nonvolatile memory 1200. Memory controller 1100 is configured to access the nonvolatile memory 1200. For example, memory controller 1100 is configured to control read, write, erase, and background operations for nonvolatile memory 1200. The background operations may include operations such as wear-leveling and garbage collection. In example embodiments, memory controller 1100 may manage nonvolatile memory device 1200 including a plurality of chips in a RAID scheme. When data stored in nonvolatile memory device 1200 is inaccessible due to a failure of one of the chips, memory controller 110 performs a RAID rebuild operation according to example embodiments described above. That is, when a chunk corresponding to a failed chip is recovered, only valid pages are recovered and invalid pages are not recovered except for a special case. The special case corresponds to recovery of a page storing data (e.g., a reverse map page (MP)) which may be used to determine whether pages in a selected stripe are valid.

Memory controller 1100 is configured to provide an interface between nonvolatile memory 1200 and the host. Memory controller 1100 is configured to drive firmware for controlling nonvolatile memory 1200. Memory controller 1100 may include components such as a random access memory (RAM), a processing unit, a host interface, a memory interface, and an error correction unit.

Memory controller 1100 may communicate with an external device through connector 1300. Memory controller 1100 may communicate with an external device (e.g., a host) using a specific interface protocol. In example embodiments, memory controller 1100 is configured to communicate with an external device using at least one of various interface protocols such as Universal Serial Bus (USB), multimedia card (MMC), eMMC (embedded MMC), peripheral component interconnection (PCI), PCI-express (PCIe), Advanced Technology Attachment (ATA), Serial ATA (SATA), Parallel ATA (PATA), Small Computer System Interface (SCSI), Enhanced Small Disk Interface (ESDI), Integrated Drive Electronics (IDE), Firewire, Universal Flash Storage (UFS), and Nonvolatile Memory express (NVMe). In example embodiments, a write command defined by the above interface protocols may include size information of write data.

Nonvolatile memory 1200 may be implemented with various nonvolatile memory devices such as electrically erasable and programmable ROM (EPROM), NAND flash memory, NOR flash memory, phase-change RAM (PRAM), resistive RAM (ReRAM), ferroelectric RAM (FRAM), and spin-torque magnetic RAM (STT-MRAM).

In example embodiments, memory controller 1100 and nonvolatile memory 1200 may be integrated into a single semiconductor device. In example embodiments, memory controller 1100 and nonvolatile memory 1200 may be integrated into a single semiconductor device to constitute a solid state drive (SSD). Memory controller 1100 and nonvolatile memory 1200 may be integrated into a single semiconductor device to constitute a memory card. For example, memory controller 1100 and nonvolatile memory 1200 may be integrated into a single semiconductor device to constitute a memory card such as a personal computer memory card international association (PCMCIA), a compact flash card (CF), a smart media card (SM, SMC), a memory stick, a multimedia card (MMC, RS-MMC, and MMCmicro), a SD card (SD, miniSD, and microSD), and a universal flash memory device (UFS).

Figure 14:
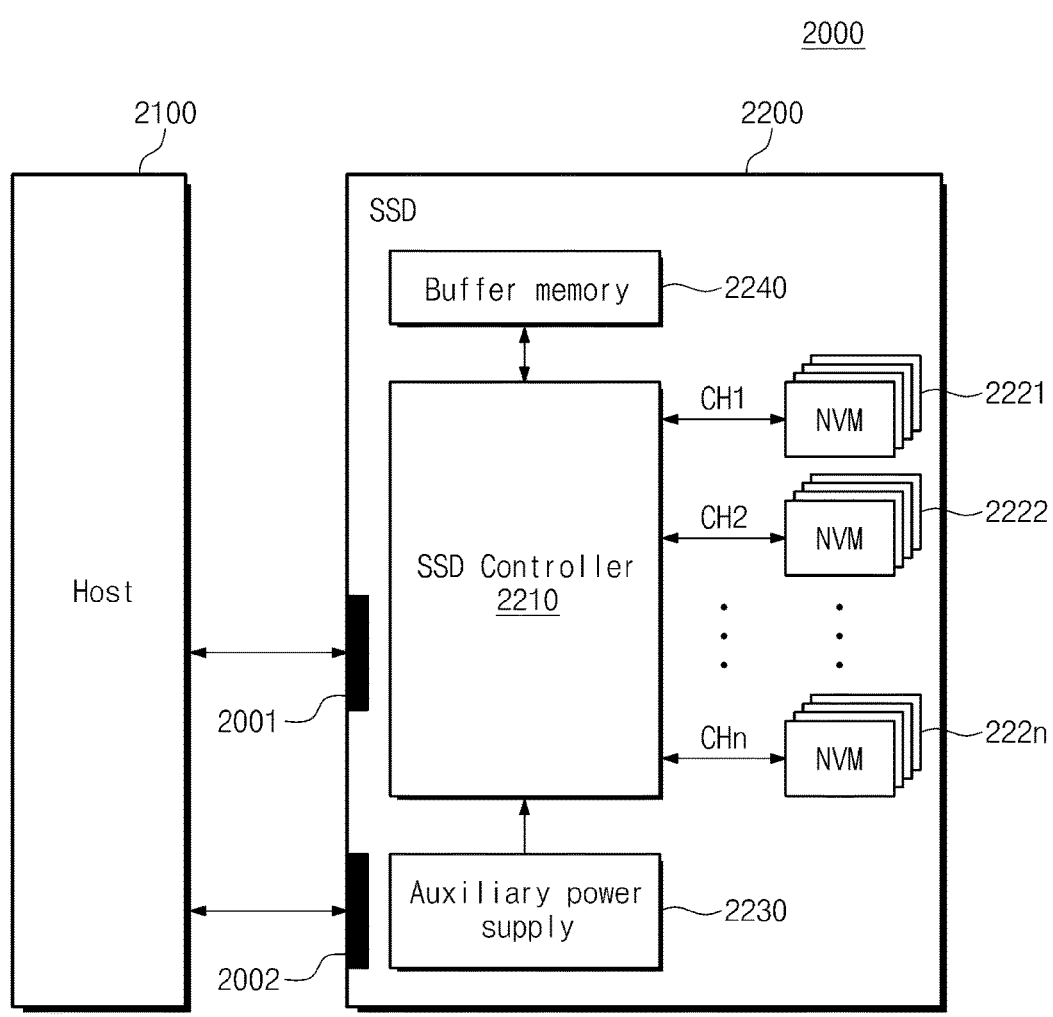
FIG. 14 is a block diagram of a solid state drive (SSD) system to which example embodiments of a nonvolatile memory device is applied.

FIG. 14 is a block diagram of a solid state drive (SSD) system 2000 to which example embodiments of a nonvolatile memory device is applied. As illustrated, SSD system 2000 includes a host 2100 and an SSD 2200. SSD 2200 transmits/receives a signal SIG to/from host 2100 through a signal connector 2001 and is supplied with power PWR through a power connector 2002. SSD 2200 includes an SSD controller 2210, a plurality of flash memories (NVM) 2221 to 222n, an auxiliary power supply 2230, and a buffer memory 2240.

SSD controller 2210 may control flash memories 2221 to 222n in response to a signal SIG received from host 2100. For example, SSD controller 2210 is configured to control read, write, erase, and background operations. The background operations may include operations such as wear-leveling and garbage collection. In example embodiments, SSD controller 2210 may perform a RAID rebuild operation as described above with reference to FIG. 10. When data in one of flash memories 2221 to 222n is inaccessible, SSD controller 2210 performs a RAID rebuild operation according to example embodiments described above. That is, when a chunk corresponding to the inaccessible flash memory is recovered, only valid pages are recovered and invalid pages are not recovered except for a special case. The special case corresponds to recovery of a page storing data (e.g., a reverse map page (MP)) which may be used to determine whether pages in a selected stripe are valid.

Auxiliary power supply 2230 is connected to host 2100 through power connector 2002. Auxiliary power supply 2230 may be supplied with the power PWR from host 2100. Auxiliary power supply 2230 may supply power of SSD system 2000 when power is not sufficiently supplied from host 2100. In example embodiments, auxiliary power supply 2230 may be disposed inside or outside SSD 2200. For example, auxiliary power supply 2230 may be disposed on a mainboard and may supply auxiliary power to SSD 2200.

Buffer memory 2240 operates as a buffer memory of the SSD 2200. For example, buffer memory 2240 may temporarily store data received from host 2100 or data received from flash memories 2221 to 222n, or may temporarily store metadata (e.g., a mapping table) of flash memories 2221 to 222n. Buffer memory 2240 may include a nonvolatile memory such as DRAM, SDRAM, double data rate (DDR) SDRAM, low power double data rate (LPDDR) SDRAM, and SRAM and nonvolatile memories such as FRAM, ReRAM, STT-MRAM, and PRAM. In example embodiments, storage controller 2210 and flash memories 2221 to 222n may be integrated into a single semiconductor device.

Figure 15:
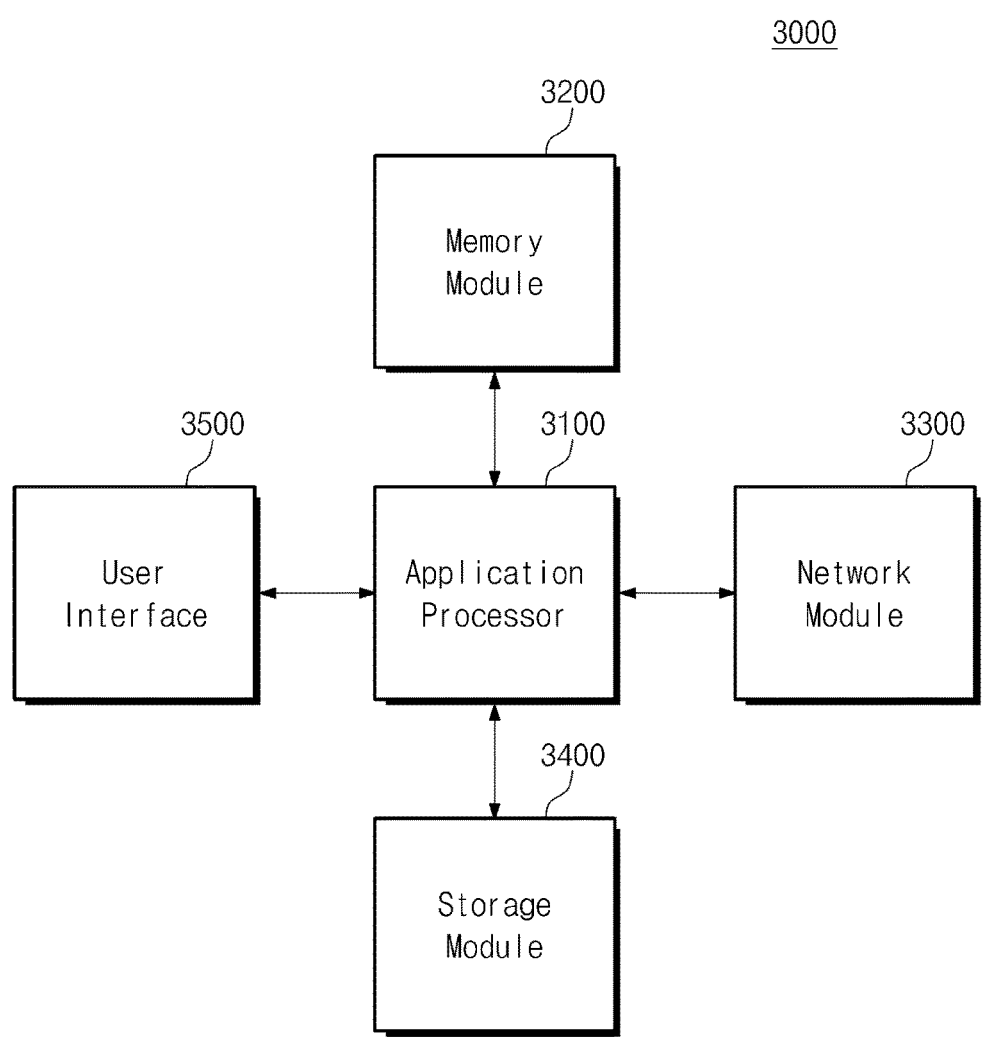
FIG. 15 is a block diagram of a user system to which example embodiments of a nonvolatile memory device is applied.

FIG. 15 is a block diagram of a user system 3000 to which example embodiments of a nonvolatile memory device is applied. As illustrated, user system 3000 includes an application processor 3100, a memory module 3200, a network module 3300, a storage module 3400, and a user interface 3500.

Application processor 3100 may drive components included in the user system 3000 and an operating system (OS). In example embodiments, application processor 3100 may include controllers to control the components included in user system 3000, interfaces, and a graphic engine. Application processor 3100 may be provided as a system-on-chip (SoC).

Memory module 3200 may operate as a main memory, a working memory, a buffer memory or a cache memory of user system 3000. Memory module 3200 may include a volatile random access memory such as DRAM, SDRAM, DDR SDRAM, DDR2 SDRAM, DDR3 SDRAM, LPDDR SDRAM, LPDDR2 SDRAM, and LPDDR3 SDRAM or a nonvolatile random access memory such as PRAM, ReRAM, MRAM, and FRAM.

Network module 3300 may communicate with external devices. For example, network module 3300 may support wireless communication protocols such as Code Division Multiple Access (CDMA), Global System for Mobile communication (GSM), wideband CDMA (WCDMA), CDMA-2000, Time Division Multiple Access (TDMA), Long Term Evolution (LTE), Worldwide Interoperability for Microwave Access (Wimax), wireless local area network (WLAN), Ultra-wideband (UWB), Bluetooth, and Wireless Display (WI-DI). In example embodiments, the network module 3300 may be included in the application processor 3100.

Storage module 3400 may store data. For example, the storage module 3400 may store data received from application processor 3100. Alternatively, storage module 3400 may transmit data stored in storage module 3400 to application processor 3100. In example embodiments, storage module 3400 may be implemented using nonvolatile semiconductor memory devices such as phase-change RAMs (PRAMs), magnetic RAMs (MRAMs), resistive RAMs (ReRAMs), NAND flash memories, NOR flash memories, and three-dimensional (3D) NAND flash memories.

In example embodiments, storage module 3400 may perform a RAID rebuild operation as described above with reference to FIG. 1 or FIG. 10, for example. Storage module 3400 may communicate with the application processor 3100 based on a predetermined interface. Storage module 3400 may adjust an execution time of garbage collection based on a write command received from application processor 3100.

User interface 3500 may include interfaces that input data or a command to application processor 3100 or output data to an external device. For example, user interface 3500 may include user input interfaces such as a keyboard, a keypad, a button, a touch panel, a touch screen, a touch pad, a touch ball, a camera, a microphone, a gyroscope sensor, and a vibration sensor. User interface 3500 may include user output interfaces such as a liquid crystal display (LCD), an organic light emitting diode (OLED) display, an active matrix OLED (AMOLED), an LED, a speaker, and a monitor.

As described above, both recovery of data stored in a failure disk and a garbage collection operation may be performed in a RAID storage device using a plurality of solid state disks. The number of page copies of invalid data may be reduced during a data recovery operation to achieve life extension of the RAID storage device and high resource efficiency.

The above-disclosed subject matter is to be considered illustrative, and not restrictive, and the appended claims are intended to cover all such modifications, enhancements, and other features, which fall within the true spirit and scope of inventive concept. Thus, to the maximum extent allowed by law, the scope of inventive concept is to be determined by the broadest permissible interpretation of the following claims and their equivalents, and shall not be restricted or limited by the foregoing detailed description. While some example embodiments have been particularly shown and described, it should be understood by one of ordinary skill in the art that variations in form and detail may be made therein without departing from the spirit and scope of the claims.

What is claimed is:

1. A method of managing a plurality of storage devices controlled in a redundant array of inexpensive disks (RAID) scheme, the method comprising:
   detecting a failure disk among the storage devices;
   selecting one of a plurality of stripes of the storage devices according to a result of the detection;
   identifying a valid page of data included in a normal chunk of data of the selected stripe, and a valid page of data of a lost chunk mapped to the failure disk with reference to address mapping information;
   recovering the valid page of the lost chunk among chunks included in the selected stripe with reference to information on the identified valid page; and
   copying the recovered valid page of the lost chunk and the valid page of the normal chunk to a new stripe of the storage devices.

2. The method of claim 1, wherein the RAID scheme is a log-structured RAID scheme, and wherein the address mapping information is managed in the log-structured RAID scheme to sequentially write data into a physical area of the storage devices.

3. The method of claim 2, wherein the address mapping information includes a first map page which maps a logical address of a page included in the selected stripe to a physical address, and a reverse map page which maps the physical address of the page included in the selected stripe to the logical address.

4. The method of claim 3, wherein the first map page is obtained from a mapping table of a host and the reverse map page is read from a single page area of the selected stripe.

5. The method of claim 3, wherein the valid page of the normal chunk corresponds to a page in which an entry value of the first map page and an entry value of the reverse map page match each other.

6. The method of claim 3, further comprising:
when the reverse map page is determined to be stored in the lost chunk, recovering the reverse map page through a RAID rebuild operation before identifying the valid pages.

7. The method of claim 6, wherein the valid pages are identified by comparing the recovered reverse map page with the first map page.

8. The method of claim 3, wherein the reverse map page is not copied to the new stripe and is discarded when the valid pages are copied to the new stripe.

9. The method of claim 1, wherein parity pages among the normal chunks for recovering the valid page of the lost chunk are not copied to the new stripe and are discarded.

10. The method of claim 1, wherein at least one of the storage devices includes nonvolatile memory devices each including a three-dimensional memory area.

11. A redundant array of inexpensive disks (RAID) storage device, comprising:
a plurality of solid state drives; and
a host interface configured to connect the solid state drives to a host,
wherein among pages of a lost chunk included in a failure disk among the solid state drives, only valid pages are recovered during a RAID rebuild operation to recover the lost chunk using a parity chunk.

12. The RAID storage device of claim 11, wherein the valid pages are selected with reference to address map information managed in a log-structured RAID scheme.

13. The RAID storage device of claim 12, wherein the address mapping information includes a first map page which maps logical addresses of pages included in a stripe to physical addresses, and a reverse map page which maps the physical addresses of pages included in the stripe to the logical addresses.

14. The RAID storage device of claim 13, wherein the reverse map page is recovered through the RAID rebuild operation when the reverse map page is determined to be stored in the lost chunk.

15. The RAID storage device of claim 14, wherein recovery of the reverse map page through the RAID rebuild operation on the reverse map page is performed before identification of the valid pages.

16. The RAID storage device of claim 11, wherein the RAID rebuild operation is performed in the host.

17. The RAID storage device of claim 11, further comprising:
a storage controller configured to perform the RAID rebuild operation.

18. A method of managing a plurality of solid state drives, the method comprising:
selecting one of a plurality of stripes allocated to manage the solid state drives in a log-structured redundant array of inexpensive disks (RAID) scheme;
identifying a valid page included in a normal chunk of the selected stripe and a valid page of a lost chunk mapped to a failure disk among the plurality of solid state drives with reference to: a first map page which maps a logical address of a page included in the selected stripe to a physical address, and a reverse map page which maps the physical address of the page included in the selected stripes to the logical address;
recovering a valid page included in the lost chunk among chunks included in the selected stripe with reference to information on the identified valid page; and
copying the recovered valid page of the lost chunk and the valid page of the normal chunk to a new stripe.

19. The method of claim 18, further comprising:
when the reverse map page is included in the lost chunk, recovering the reverse map page using a RAID rebuild operation.

20. The method of claim 19, wherein among pages included in the normal chunk, parity pages for recovering the valid page of the lost chunk, and the reverse map page, are not copied to the new stripe and are discarded.

* * * * *